(12) United States Patent
Igarashi

(10) Patent No.: US 7,791,632 B2
(45) Date of Patent: Sep. 7, 2010

(54) OPTICAL SCANNING DEVICE AND IMAGE FORMING APPARATUS USING THE SAME

(75) Inventor: Jun Igarashi, Nikko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/370,376

(22) Filed: Feb. 12, 2009

(65) Prior Publication Data
US 2009/0202273 A1     Aug. 13, 2009

(30) Foreign Application Priority Data
Feb. 13, 2008  (JP) .............................. 2008-031521

(51) Int. Cl.
*B41J 15/14* (2006.01)
*B41J 27/00* (2006.01)

(52) U.S. Cl. ...................................... 347/241; 347/256
(58) Field of Classification Search ................. 347/230, 347/241–244, 256–258
See application file for complete search history.

(56) References Cited

U.S. PATENT DOCUMENTS

| 7,072,087 B2 | 7/2006 | Nakahata ..................... 359/204 |
| 7,248,391 B2 | 7/2007 | Igarashi ....................... 359/205 |
| 7,453,616 B2 * | 11/2008 | Shimomura .............. 359/206.1 |

FOREIGN PATENT DOCUMENTS

| JP | 2002196269 A | * | 7/2002 |
| JP | 2003-202512 |  | 7/2003 |
| JP | 2005-004050 |  | 1/2005 |

* cited by examiner

*Primary Examiner*—Hai C Pham
(74) *Attorney, Agent, or Firm*—Fitzpatrick, Cella, Harper & Scinto

(57) ABSTRACT

An optical scanning device includes two scanning units which are disposed opposed to each other with a scanning deflector arranged therebetween, wherein one scanning unit has first and second imaging optical elements while the other scanning unit has third and fourth imaging optical elements, wherein the one scanning unit includes a light blocking member for intercepting unwanted light reflected at an optical surface of the fourth imaging optical element, wherein the third imaging optical element is provided at a light path between the fourth imaging optical element and the first light blocking member, and wherein the third imaging optical element has a positive refracting power in the sub-scan section through which unwanted light reflected at the optical surface of the fourth imaging optical element passes.

16 Claims, 13 Drawing Sheets

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is particularly suitably usable in an image forming apparatus such as a laser beam printer, a digital copying machine or a multifunction printer, for example, having an electrophotographic process.

Conventionally, an optical scanning device is used in an image forming apparatus such as a digital copying machine or a laser beam printer (LBP).

In this type of optical scanning device, in an attempt to reducing the size of the overall system, an opposed scanning unit in which a plurality of light beams are scanned by one and the same optical deflector and, by imaging optical systems disposed at both sides across the optical deflector, light beams are directed to different scan surfaces to be scanned, is used.

Various proposals have been made in regard to optical scanning devices using such a method (seep patent documents Nos. 1 and 2 below).

Patent documents Nos. 1 and 2 show an optical scanning device in symmetric directions with respect to a polygon mirror (optical deflector) to be share thereby.

In the optical scanning device of the type having such shared polygon mirror, when an image is formed with one optical scanning device (first scanner SK11) shown in FIG. 19, corresponding to FIG. 1 of patent document No. 1, the following problems may occur.

Namely, unwanted light (ghost light) reflected by a lens surface 91a of a first imaging lens 91 of the first imaging lens system SL11 may pass through an imaging lens system SL12 of the other optical scanning device (second scanner SK12), and it may be incident on a photosensitive drum surface 99.

Furthermore, similarly to the above, there may be such unwanted light, that is, reflected light from a first imaging lens 92 of the second imaging lens system SL12 may be incident on the imaging lens system SL11.

Here, unwanted light may be reduced by depositing an antireflection film on the lens surface. However, antireflection film deposition will be difficult to do for plastic lenses used widely in recent years for light-weighting.

Therefore, some other means for solving the problem without using the antireflection film is desired.

Furthermore, in an attempt to easily accomplishing an optical scanning device for performing four-color image formation using a single polygon mirror, a sub-scan oblique incidence optical system is used to make a light beam incident on a deflecting surface of an optical deflector from an oblique direction within a sub-scan section.

FIG. 20 is a perspective view of a main portion around a polygon mirror 201 which is disclosed in FIG. 1 of patent document No. 2.

In patent document 1, in the opposed scanning unit and a sub-scan oblique incidence optical system, there is a light blocking member 206 which intercepts unwanted light to prevent the unwanted light from being incident on imaging optical elements 202a and 202b.

Namely, the unwanted light which is spatially separated from the effective light ray in the sub-scan section is blocked by use of the light blocking member 206.

Therefore, with this light blocking member 206, the unwanted light is prevented from reaching the scan surface.

[Patent Documents]
No. 1: Japanese Laid-Open Patent Application No. 2003-202512
No. 2: Japanese Laid-Open Patent Application No. 2005-4050

SUMMARY OF THE INVENTION

In recent years, the structure of the optical scanning devices is becoming more complicated in an attempt to reducing the size of the optical scanning device.

Additionally, due to insufficient precision of the box (casing) in which optical members are to be mounted, the precision of the installation of the optical elements is decreasing.

Normally, the unwanted light is blocked by the light blocking member. However, unwanted light reflected by the surface of an optical element if it is disposed with a positional error from a desired position may deviate from the predicted light path, and thus it may not be blocked by the light blocking member, but rather it may reach the scan surface placed after that light path.

If this occurs, it results in deteriorated image quality such as image density fluctuation.

In patent document No. 2, in FIG. 20, a mounting error of an imaging optical element 202b, for example, may occur. Assuming that it is tilted in the sub-scan section, unwanted light produced by reflection at the light entrance surface of the imaging optical element 202b may pass through an opening 206a of the light blocking member 206.

Then, the unwanted light coming from the opening 206a may be incident on the imaging optical element 202a and it may reach the scan surface, not shown.

If this occurs, it results in deteriorated image quality such as image density fluctuation.

The present invention provides an optical scanning device and an image forming apparatus having the same by which unwanted light can be blocked effectively even if the installation error of the optical element occurs and by which a high quality image can be produced conveniently.

In accordance with an aspect of the present invention, there is provided an optical scanning device, comprising: two scanning units each having an input optical system configured, in a sub-scan section, to make a light beam from a light source means be incident at a finite angle on a deflecting surface of deflecting means which is arranged to scanningly deflect a light beam from said light source means, and an imaging optical system configured to image, on a scan surface to be scanned, the light beam scanningly deflected by the deflecting surface of said deflecting means, said two scanning units being disposed opposed to each other with said deflecting means intervening therebetween; wherein one scanning unit of said two scanning units has at least two imaging optical elements including a first imaging optical element and a second imaging optical element disposed in this order from said deflecting means, wherein the other scanning unit of said two scanning units has at least two imaging optical elements including a third imaging optical element and a fourth imaging optical element disposed in this order from said deflecting means, wherein said one scanning unit includes a first light blocking member configured to intercept unwanted light reflected at an optical surface of said fourth imaging optical element and directed to the scan surface at one scanning unit side, wherein said third imaging optical element of said other scanning unit is provided at a light path between said fourth imaging optical element and said first light blocking member, and wherein an optical surface of said third imaging optical element through which unwanted light reflected at the optical surface of said fourth imaging optical element and directed to the scan surface at the one scanning unit side passes has a positive refracting power in the sub-scan section.

In the sub-scan section, said first light blocking member may be disposed at the light path between said deflecting means and said first imaging optical element.

When a combined refracting power in the sub-scan section of said third imaging optical element $\phi s$, a distance from the optical surface of said fourth imaging optical element where the unnecessary light is produced to a rear principal plane of said third imaging optical element in the sub-scan section is S1, a distance from a front principal plane of said third imaging optical element in the sub-scan section to said first light blocking member is L, a condition $$-(S1+L)/2 < S1-L(S1 \cdot \phi s-1) < (S1+L)/2$$

may be satisfied.

In the sub-scan section, said first light blocking member may be disposed at a light path between said first imaging optical element and said second imaging optical element.

When a combined refracting power in the sub-scan section of said first imaging optical element and said third imaging optical element is $\phi p$, a distance from the optical surface of said fourth imaging optical element of said other scanning unit where unwanted light is produced to a principal plane at the scan surface side of a synthetic system comprised of said first imaging optical element and said third imaging optical element is S2, and a distance from a principal plane at the deflecting means side of the synthetic system comprised of said first imaging optical element and said third imaging optical element to said first light blocking member is L2, a condition $$-(S2+L2)/2 < S2-L2(S2 \cdot \phi p-1) < (S2+L2)/2$$

may be satisfied.

The unnecessary light incident on said first light blocking member and intercepted thereby may be a convergent light beam in the sub-scan section.

The two scanning units may be configured so that light beams scanningly deflected by the same deflecting surface of said deflecting means are image on different scan surfaces.

The other scanning unit may include a second light blocking member configured to intercept unwanted light reflected at an optical surface of said second imaging optical element and directed to the scan surface at the other scanning unit side, wherein said first imaging optical element of said one scanning unit may be provided at a light path between said second imaging optical element and said second light blocking member, and wherein said first imaging optical element may have a positive refracting power in the sub-scan section in which the unwanted light reflected at the optical surface of said second imaging optical element and directed to the scan surface at the other scanning unit side passes.

In accordance with another aspect of the present invention, there is provided an image forming apparatus, comprising: an optical scanning device as recited above; a photosensitive member disposed at said scan surface; a developing device configured to develop an electrostatic latent image formed on said photosensitive member by a light beam scanned by said optical scanning device, into a toner images; a transfer unit configured to transfer a developed toner image to a transfer material; and a fixing device configured to fix the transferred toner images on the transfer material.

In accordance with a further aspect of the present invention, there is provided an image forming apparatus, comprising: an optical scanning device as recited above; and a printer controller for converting code data supplied from an outside machine into an imagewise signal and for inputting the imagewise signal into said optical scanning device.

In accordance with a yet further aspect of the present invention, there is provided a color image forming apparatus, comprising: an optical scanning device as recited above; and a plurality of image bearing members each being disposed at a surface to be scanned by said optical scanning device, for forming images of different colors.

The color image forming apparatus may further comprise a printer controller for converting a color signal supplied from an outside machine into imagewise data of different colors and for inputting the imagewise data into corresponding optical scanning devices.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

An optical scanning device according to the present invention may comprise an input optical system for making a light beam from light source means be incident on a deflecting surface of deflecting means which is configured to scanningly deflect a light beam emitted by light source means at a finite angle in the sub-scan section.

Furthermore, two scanning units having an imaging optical system for imaging a light beam scanningly deflected by a deflecting surface of the deflecting means may be disposed opposed to each other with the deflecting means interposed therebetween.

One scanning unit of the two scanning units may comprise at least two imaging optical elements, that is, in an order from the deflecting means, a first imaging optical element and a second imaging optical element.

The other scanning unit of the two scanning units may comprise at least two imaging optical elements, that is, in an order from the deflecting means, a third imaging optical element and a fourth imaging optical element.

The one scanning unit may include a first light blocking member for blocking unwanted light reflected by an optical surface of the fourth imaging optical element and directed to the scan surface at one scanning unit side.

The third imaging optical element of the other scanning unit may be disposed at a light path between the fourth imaging optical element and the first light blocking member.

Then, the third imaging optical element may have a positive refracting power in the sub-scan section through which the unwanted light reflected by the optical surface of the fourth imaging optical element and directed to the scan surface of the scanning unit side passes.

Preferred embodiments of the present invention will be described below with reference to the attached drawings.

Embodiment 1

Figure 1:
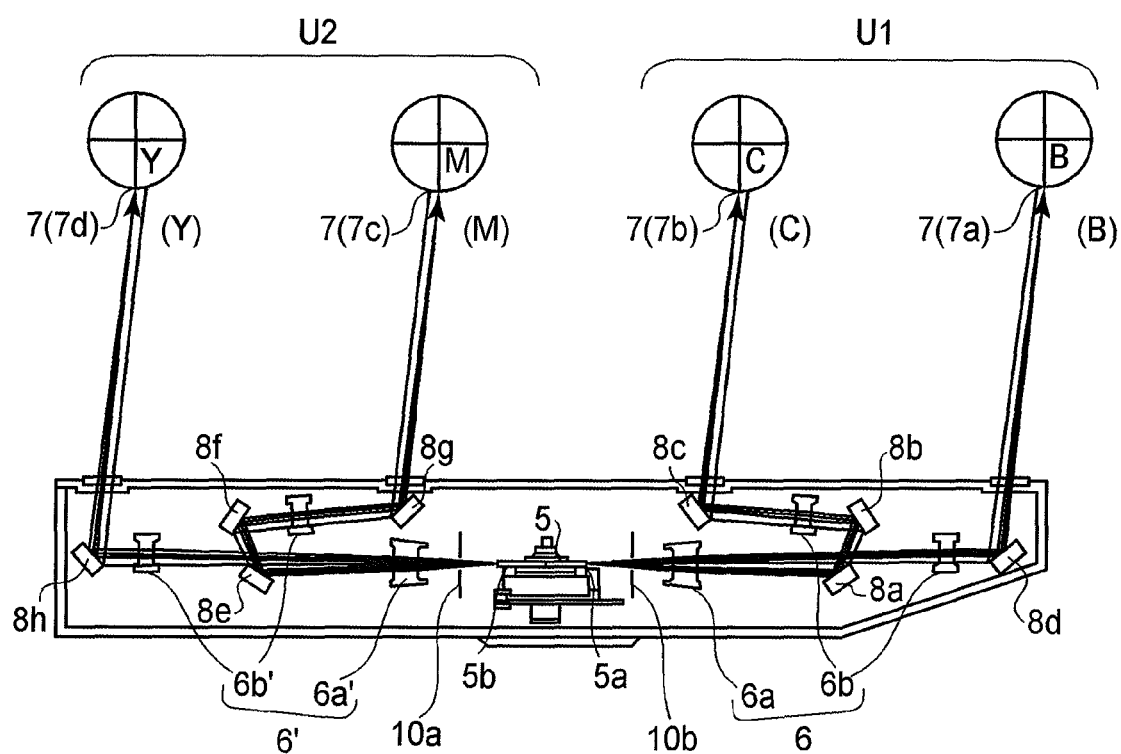
FIG. 1 is a sub-scan sectional view of a main portion of an optical scanning device according to a first embodiment of the present invention.

FIG. 1 is a sectional view (sub-scan sectional view) of a main portion of the first embodiment of the present invention, along a sub-scan direction.

Figure 2:
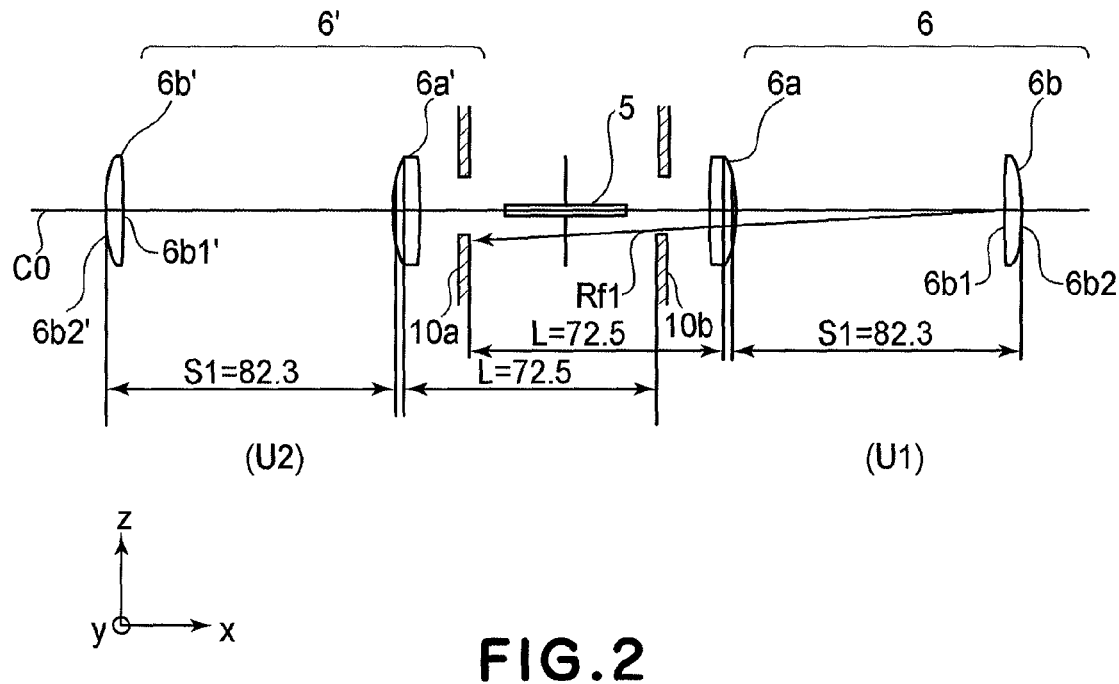
FIG. 2 is a sub-scan sectional view of the optical scanning device of the first embodiment of the present invention.

FIG. 2 is a sub-scan sectional view of the major part illustrated in FIG. 1, and the light path illustrated while being developed.

FIG. 2 illustrates the state in which unwanted light reflected by an optical surface of an imaging optical element is blocked by a light blocking member.

It should be noted that, in the following discussion, the term "sub-scan direction" (Z-direction) refers to a direction which is parallel to the rotational axis of the deflecting means.

The term "main-scan section" refers to a section having a normal thereto coinciding with the sub-scan direction (a direction parallel to the rotational axis of the deflecting means).

The term "main-scan direction" (Y-direction) refers to a direction defined by projecting a light beam scanningly deflected by the deflecting means upon the main-scan section.

The term "sub-scan section" refers to a section having a normal thereto coinciding with the main-scan direction.

Furthermore, an optical reference axis C0 refers to an axis which, when a principal ray of a light beam from an input optical system is scanningly deflected by the deflecting surface of the optical deflector and is incident at a scan surface center, passes in the sub-scan section through an incident point of the principal ray of the light beam upon the deflecting surface and which is perpendicular to the deflecting surface.

In these drawings, denoted at U1 and U2 are first and second scanning units (stations), respectively.

A first scanning unit U1 which is one of the two scanning units is comprised of two scanners B and C for B (black) and C (cyan).

Furthermore, a second scanning unit U2 which is the other scanning unit is comprised of tow scanners M and Y for M (magenta) and Y (yellow).

Since the first and second scanning units U1 and U2 having the same structure and optical function, the following description will be made mainly on the first scanning unit U1.

The components of the second scanning unit U2 corresponding to those of the first scan scanning unit U1 are denoted by reference numerals with parentheses.

The components of the second scanning unit U2 will be explained as required.

Denoted at 5 is an optical deflector (polygon mirror) as the deflecting means which is rotated at a constant speed by driving means such as a motor (not shown). This optical deflector is shared by the first and second scanning units U1 and U2.

Denoted at 6 (6') is an imaging optical system which includes a first imaging lens 6a as the first imaging optical element and a second imaging lens 6b as the second imaging optical element, both of which are made of a plastic material.

Here, the imaging optical element 6a' corresponds to a third imaging optical element, and imaging optical element 6b' corresponds to a fourth imaging optical element.

It is to be noted that the imaging optical system 6 (6') may comprise three or more imaging optical elements.

The imaging optical system 6 (6') serves to image, into a spot, the light beam based on imagewise information and being scanningly deflected by the optical deflector 5, upon the photosensitive drum surface 7a as the scan surface 7b (7c, 7d), to be described below, in the main-scan section.

Additionally, in the sub-scan section, the imaging optical system 6 (6') is configured to provide an optically conjugate relationship between the deflecting surface 5a (5b) of the optical deflector 5 and the photosensitive drum surface 7a and 7b (7c and 7d), whereby a tilt correction function is provided.

The first imaging lens 6a (6a') in the present embodiment is shared by two scanners B and C (M and Y) constituting the first (second) scanning unit U1 (U2).

Denoted at 7 is a photosensitive drum as the recording medium, and denoted at 7a, 7b, 7c and 7d are, in this order, photosensitive drum surfaces (scan surfaces) as recording media for B, C, M and Y colors.

Denoted at 8a, 8b, 8c and 8d (8e, 8f, 8g and 8h) are reflecting mirrors as the reflection members which comprise plane mirrors.

These mirrors function to reflect the light beam passed through the first and second imaging lenses 6a and 6b (6a' and 6b') to corresponding photosensitive drum surfaces 7a and 7b (7c and 7d).

It is to be noted that the reflecting mirrors 8a, 8b and 8c (8e, 8f and 8g) may have a power in the main-scan section or in the sub-scan section.

Denoted at 10b (10a) is unwanted light blocking member of the first (second) scanning unit U1 (U2). The unwanted light blocking member will be referred to also as "light blocking member".

The unwanted light blocking member 10b (10a) is disposed while being spatially separated, in the sub-scan direction, from the light path of the scan light beam scanningly deflected by the deflecting surface of the optical deflector 5 and incident on the scan surface 7a or 7b (7c or 7d).

The unwanted light blocking member 10b corresponds to the first light blocking member, while the unwanted light blocking member 10a corresponds to the second light blocking member.

In the sub-scan section, the first light blocking member 10b is disposed between the deflecting means 5 and the first imaging optical element 6a.

Furthermore, the second light blocking member 10a is disposed between the deflecting means 5 and third imaging optical element 6a'.

The unwanted light blocking member 10a (10b) in the present embodiment intercepts the unwanted light (e.g., flare light or ghost light) reflected by a light exit surface (optical surface) 6b2 (6b2') of the second imaging lens 6b (6b'), while it passes the light beam scanningly deflected by the optical deflector 5.

Here, the unwanted light incident on the first and second light blocking members 10a and 10b and blocked thereby is a convergent light beam in the sub-scan section.

Here, the unwanted light Rf1 is such light beam which is incident on the imaging optical system in the other scanning unit of scanning units disposed opposed to each other with the deflecting means interposed therebetween and which is incident on the scan surface of the other scanning unit side.

The unwanted light blocking member 10a (10b) is comprised of a light blocking member having an opening or of discrete light blocking members split into two in the sub-scan direction.

In this embodiment as described above, the other scanning unit U2 includes a second light blocking member 10a which intercepts the unwanted light reflected by the optical surface 6b2 of the second imaging optical element 6b and directed toward the scan surface at the other scanning unit U2 side.

Furthermore, the first imaging optical element 6a of the one scanning unit U1 is provided at the light path between the second imaging optical element 6b and the second light blocking member 10a.

Then, the first imaging optical element 6a has a positive refracting power in the sub-scan section.

In this embodiment as shown in FIG. 1, the first and second by second scanning units U1 and U2 are disposed symmetrically at both sides about the rotational axis of the optical deflector 5 in pairs, whereby an opposed scanning unit is provided.

Thus, a structure for an optical scanning device which can be incorporated into a color image forming apparatus of four colors (Y, M, C, B) is accomplished.

Then, in the first scanning unit U1, in sub-scan section two light beams emitted from two light source devices (not shown) are obliquely incident on the same deflecting surface 5a of the optical deflector 5 at an oblique incidence angle γ and from upper and lower directions of the optical reference axis C0.

Furthermore, in the second scanning unit U2, in the sub-scan section two light beams emitted from two light source devices (not shown) are obliquely incident on the same deflecting surface 5a of the optical deflector 5 at a finite angle (oblique incidence angle) γ and from upper and lower directions of the optical reference axis C0.

Then, the light beam incident from obliquely above to the deflecting surface 5a (5b) is reflected obliquely downwardly, while the light beam incident from obliquely below is reflected obliquely above. Then, by the imaging optical system 6 (6'), the light path is divided through the reflecting mirrors 8a, 8b, 8c and 8d (8e, 8f, 8g and 8h).

Then, the thus divided four light beams are directed to corresponding photosensitive drum surfaces (Y, M, C and B) 7a, 7b, 7c and 7d, whereby a color image is formed.

In FIG. 1 as described above, there are plural scanning units such as first and second scanning units U1 and U2, which are disposed to share the optical deflector 5.

Then, a plurality of light beams from a plurality of scanning units U1 and U2 are directed, in each scanning unit U1 or U2m to different deflecting surfaces 5a and 5b of the optical deflector 5.

Then, plural light beams in each of the scanning units U1 and U2 are incident on different scan surfaces 7a, 7b, 7c and 7d, and a color image is formed.

Furthermore, in this embodiment, since both of two light beams scanningly deflected by the same deflecting surface 5a (5b) pass through the first imaging lens 6a (6a'), the imaging optical system 6 (6') can be made with a fewer number imaging lenses, and thus reduction in size is enabled.

Figure 3:
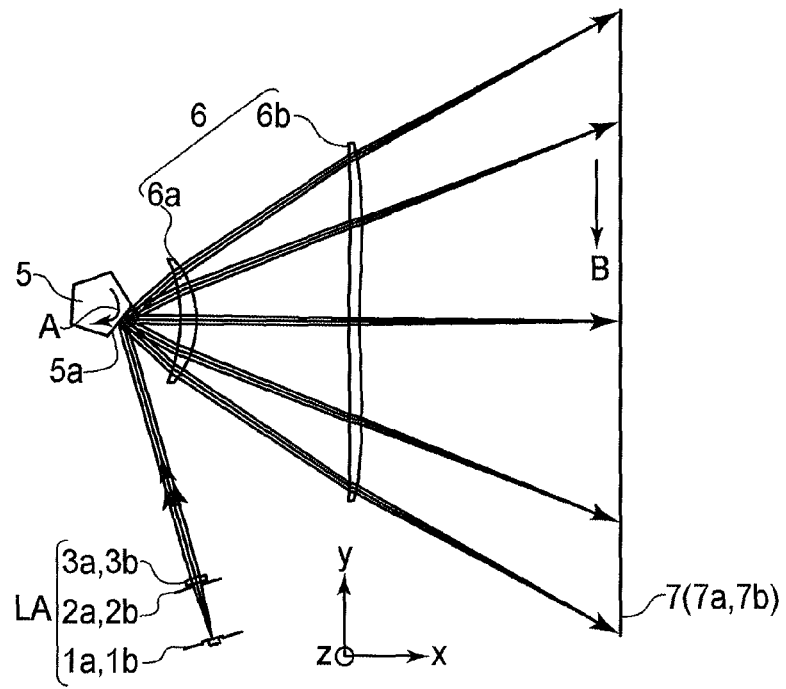
FIG. 3 is a main-scan sectional view of the optical scanning device of the first embodiment of the present invention.
Figure 4A:
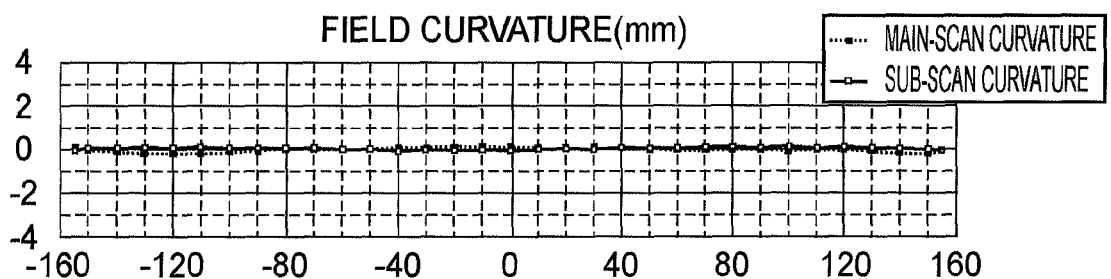
FIGS. 4A-4D are diagrams illustrating geometric aberration and uniformity of the sub-scan magnification in the first embodiment of the present invention.
Figure 4B:
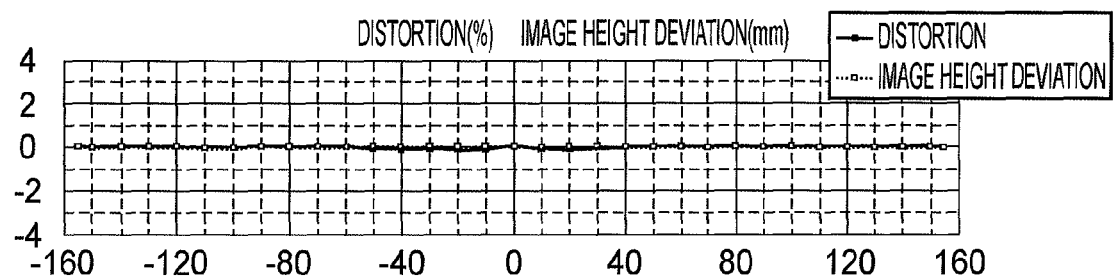
Figure 4C:
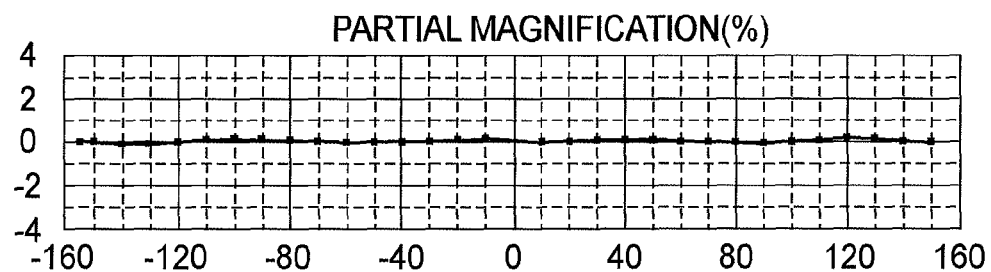
Figure 4D:
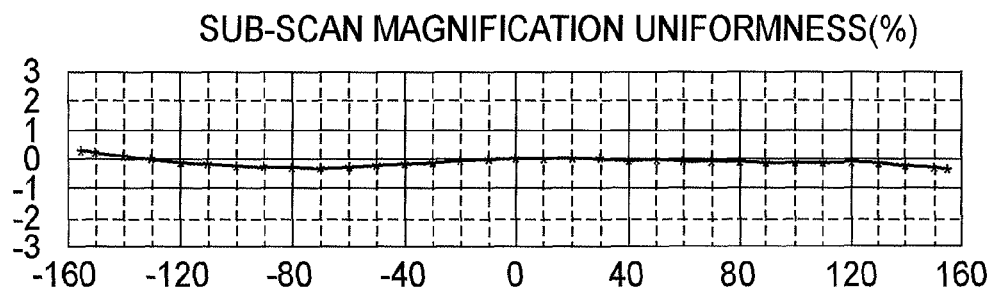

FIG. 3 is a sectional view (main-scan sectional view) of a main portion in main-scan direction of the first scanning unit U1 illustrated in FIG. 1, wherein the light path is shown while being developed. It is to be noted that the unwanted light blocking member and the reflecting mirror shown in FIG. 1 are omitted in FIG. 3.

Furthermore, although only the first scanning unit U1 is shown in FIG. 3, the structure and the optical function of the second scanning unit U2 are the same as the first scanning unit U1.

In FIG. 3, denoted at 1a and 1b are light source devices which comprise a semiconductor laser.

Denoted at 2a and 2b are aperture stops for shaping divergent light beams emitted from a plurality of light source means 1a and 1b into a predetermined beam profile.

Denoted at 3a and 3b are condenser lenses (anamorphic lenses) each having different refracting powers (powers) in the main-scan direction (main-scan section) and the sub-scan direction (sub-scan section).

Thus, a divergent light beam passed through the aperture stop 2a or 2b is converted into a parallel light beam (or alternatively convergent light beam) in the main-scan direction, while being converted into a convergent light beam in the sub-scan direction.

It is to be noted that the light source means 1a and 1b, aperture stops 2a and 2b, and condenser lenses 3a and 3b are components of the input optical system LA.

The in input optical system LA functions to direct a plurality of light beams emitted from a plurality of light source means 1a and 1b to the same deflecting surface 5a of the deflecting means 5 at different angles in sub-scan section.

It should be noted that the condenser lens 3a or 3b may be constituted by two optical elements (collimator lens and cylinder lens).

Furthermore, the condenser lenses 3a and 3b may be unified.

Denoted at 5 is an optical deflector as the deflecting means which comprises a polygon mirror (rotary polygonal mirror) having a five-surface structure with a circumscribed circle diameter of 34 mm. It is rotated at a constant speed (constant angular speed) in the direction of an arrow A in the diagram by driving means such as a motor (not shown).

Denoted at 6 is an imaging optical system having a light collecting function and fθ characteristic to be described later.

The imaging optical system 6 in the present embodiment includes first and second imaging lenses 6a and 6b (these may be referred to as "imaging lens") which are imaging optical elements having different powers in the main-scan direction (main-scan section) and in the sub-scan direction (sub-scan section inner).

The first and second imaging lenses 6a and 6b of the present embodiment are made of a plastic material, and function to image a plurality of light beams based on imagewise information and scanningly deflected by the same deflecting surface 5a of the optical deflector 5, upon different photosensitive drum surfaces 7a and 7b (scan surfaces), respectively.

Additionally, the first and second imaging lenses 6a and 6b serve to provide a conjugate relationship between the deflecting surface 5a of the optical deflector 5 and the photosensitive drum surface 7a or 7b in the sub-scan section, thereby to perform surface tilt compensation of the deflecting surface 5a.

Here, the third imaging optical element 6a' of the other scanning unit U2 is provided at a light path between the fourth imaging optical element 6b' and the first light blocking member 10b.

The third imaging optical element 6a' has a positive refracting power in the sub-scan section in which the unwanted light reflected by the optical surface 6b2' of the fourth imaging optical element 6b' and directed to the scan surface 7 of the one scanning unit U1 side passes.

With respect to the optical axis of the first imaging lens 6a, the first imaging lens 6a has a positive power in the main-scan section and in the sub-scan section.

With respect to the optical axis of the second imaging lens 6b, the second imaging lens 6b has a negative power in the in main-scan section and a positive power in the sub-scan section.

Here, the term fθ characteristic refers to that there is a relationship that, when the height from an optical axis is denoted by Y and a constant is denoted by f, on the image plane (scan surface 7a or 7b) the light beam incident with a field angle (scan angle) θ is imaged at a position Y=f*θ.

In other words, it is such characteristic that the scan width (scan speed) per a unit field angle is held even throughout the whole region of the scan surface.

Then, the constant f is referred to as fθ coefficient.

Furthermore, if the light beam incident on the imaging optical system 6 is a parallel light beam, the constant f takes a value the same as the paraxial focal distance f of the imaging optical system 6.

Denoted at 7 (7a, 7b) is a photosensitive drum surface (photosensitive drum) as the scan surface.

In the present embodiment, two divergent light beams emitted from two light source means 1a and 1b while being optically modulation in accordance with the imagewise information are regulated by corresponding aperture stops 2a and 2b, respectively, and these are incident on the condenser lenses 3a and 3b, respectively.

Within the main-scan section, the light beams incident on the condenser lenses 3a and 3b emerge therefrom as parallel light beams.

On the other hand, within the sub-scan section, these light beams are converged and imaged as a line image (line image being elongated in the main-scan direction) on the same deflecting surface 5a of the optical deflector 5, with different angles.

Then, the two light beams scanningly deflected by the deflecting surface 5a of the optical deflector 5 are imaged by the first and second imaging lenses 6a and 6b, respectively, into a spot shape on the different photosensitive drum surfaces 7a and 7b, respectively.

Here, it should be noted that the light beam from the light source means 1a which is incident on the deflecting surface 5a of the optical deflector 5 from obliquely above in the sub-scan section is reflected obliquely downwardly, while on the other hand the light beam from the light source means 1b which is incident on the deflecting surface from obliquely below is reflected obliquely upwardly.

Then, the optical scanning is performed in the direction of an arrow B (main-scan direction) on the photosensitive drum surfaces 7a and 7b by rotating the optical deflector 5 in the direction of an arrow A.

With this procedure, image recording is performed on the photosensitive drum surfaces 7a and 7b as the recording media.

It should be noted that, in the present embodiment, on an assumption that the printing span corresponding to "A3 size" should be scanned, the optical system is structured to assure an effective scan width of 310 mm on the scan surface 7.

However, the invention is not limited to this, and any other larger size or small size can be met.

The first and second imaging lenses 6a and 6b of the present embodiment have a refracting surface shape that can be represented by the following shape expressions.

When the point of intersection with the optical axis is taken as an origin, the optical axis direction is taken as an X axis, an axis orthogonal to the optical axis in the main-scan plane is taken as a Y axis, and an axis orthogonal to the optical axis in the sub-scan plane is taken as a Z axis, the shape in the meridional direction corresponding to the main-scan direction is expressed by an equation below.

$$X = \frac{Y^2/R}{1+(1-(1+K)(Y/R)^2)^{1/2}} + B_4 Y^4 + B_6 Y^6 + B_8 Y^8 + B_{10} Y^{10} \quad (a)$$

wherein R is the meridional curvature radius on the optical axis, and K, B4, B6, B8 and B10 are aspherical coefficients.

On the other hand, the shape in the sagittal direction corresponding to the sub-scan direction (a direction including the optical axis and orthogonal to the main-scan direction) is expressed by an equation below.

$$S = \frac{Z^2/r'}{1+(1-(Z/r')^2)^{1/2}} \quad (b)$$

Here, the curvature radius (sagittal curvature radius) r' in the sub-scan direction at a position spaced by Y from the optical axis in the main-scan direction can be expressed by an equation below.

$$r'=r_0(1+D_2 Y^2+D_4 Y^4+D_6 Y^6+D_8 Y^8+D_{10} Y^{10})$$

where $r_0$ is the sagittal curvature radius on the optical axis, and $D_2$, $D_4$, $D_6$, $D_8$ and $D_{10}$ are coefficients.

It should be noted that the sagittal curvature radius r' off the optical axis is defined in a plane including a normal to the meridional at each position and being perpendicular to the main-scan surface.

Furthermore, although the multinomial expression in the shape expression equation is expressed by using a function up to the tenth order, the degree may be higher or lower than this.

Furthermore, with regard to the surface shape expression equation itself, anyone including an equivalent degree of freedom of the surface expression may be used with similar advantageous results of the present invention.

Table 1 and Table 2 below show numerical values of optical disposition of the optical elements in the first embodiment as well as those of the surface shape of the imaging optical elements (imaging lenses or scanning lenses).

In Table 2, the first surface is the light entrance surface of the imaging lens $6a$, the second surface is the light exit surface of the first imaging lens $6a$, the third surface is the light entrance surface of the second imaging lens, and the fourth surface is the light exit surface of the second imaging lens.

Furthermore, "E-x" means $10^{-x}$.

Here, the aspherical coefficients from B4u to B10u and aspherical coefficients from D2u to D10u are coefficients for specifying the shape of lens surface at the side remote from the light source means 1, across the optical axis, in the main-scan section and in the sub-scan section, respectively.

Furthermore, the aspherical coefficients from B4l to B10l and aspherical coefficients from D2l to D10l are coefficients for specifying the shape of lens surface at the light source means 1 side, across the optical axis, in the main-scan section and in the sub-scan section, respectively.

In this embodiment, in the main-scan section, the light beam emitted from the light source means 1 is incident on the deflecting surface $5a$ of the optical deflector 5 at a certain angle with respect to the optical axis of the imaging optical system 6. Therefore, the fluctuation (sag) of the deflecting surface with the rotation of the optical deflector 5 produced at scan start side and the end side becomes symmetric.

In order to well compensate asymmetric changes of the field curvature or spot diameter in the main-scan direction with respect to the optical axis resulting from such asymmetric sag, each of the first and second imaging lenses $6a$ and $6b$ is formed with a surface where the curvature radius in the sub-scan direction changes asymmetrically along the main-scan direction relative to the optical axis.

Furthermore, in the second, third and fourth surfaces, aspherical coefficients from D2u to D10u and aspherical coefficients from D2l to D10l in the sub-scan section are different, and it is seen that the curvature in the sub-scan section changes asymmetrically with respect to the optical axis, within the effective diameter of the lens surface from the optical axis toward the off-axis.

TABLE 1

| Scanning System Data | | |
|---|---|---|
| Sub-scan Direction Oblique Incidence Angle (deg) | γ | 3 |
| f-theta Coefficient (mm/rad) | f | 210 |
| Used Wavelength (nm) | λ | 790 |
| Scanning Lens Refractive Index | N | 1.523972 |
| Largest Deflection Angle (deg) | θmax | 42.2 |
| Deflection Point to Scanning Lens R1 Surface (mm) | D1 | 29.5 |
| Scanning Lens R1 Surface to Scanning Lens R2 Surface (mm) | D2 | 8 |
| Scanning Lens R2 Surface to Scanning Lens R3 Surface (mm) | D3 | 76.0 |
| Scanning Lens R3 Surface to Scanning Lens R4 Surface (mm) | D4 | 5.0 |

TABLE 1-continued

| Scanning System Data | | |
|---|---|---|
| Scanning Lens R4 Surface to Scan Surface (mm) | D5 | 130.1 |
| Deflection Point to Scan Surface (mm) | D | 248.6 |

TABLE 2

| Scanning Lens Shape | | | | |
|---|---|---|---|---|
| | 1st Surface | 2nd Surface | 3rd Surface | 4th Surface |
| R | −6.16E+01 | −3.94E+01 | 1.55E+03 | 3.85E+02 |
| K | −8.75E+00 | −2.32E+00 | −3.57E+03 | −1.08E+02 |
| B4u | −1.75E−06 | −2.08E−06 | −3.04E−08 | −2.16E−07 |
| B6u | 3.21E−09 | 1.51E−09 | | 1.74E−11 |
| B8u | −3.26E−12 | −6.25E−13 | | −1.23E−15 |
| B10u | 1.09E−15 | −2.27E−16 | | 3.51E−20 |
| B4l | −1.75E−06 | −2.08E−06 | −3.04E−08 | −2.16E−07 |
| B6l | 3.21E−09 | 1.51E−09 | | 1.74E−11 |
| B8l | −3.26E−12 | −6.25E−13 | | −1.23E−15 |
| B10l | 1.09E−15 | −2.27E−16 | | 3.51E−20 |
| r | 1.20E+02 | −3.80E+01 | 1.95E+02 | −4.78E+01 |
| D2u | | 5.69E−05 | −6.16E−05 | 1.02E−04 |
| D4u | | 1.72E−07 | −5.50E−09 | −1.33E−08 |
| D6u | | | 7.29E−13 | 3.92E−12 |
| D8u | | | −3.80E−17 | −4.75E−16 |
| D10u | | | 1.95E−21 | 4.03E−20 |
| D2l | | 3.53E−05 | −6.16E−05 | 1.02E−04 |
| D4l | | 1.55E−07 | −5.50E−09 | −1.51E−08 |
| D6l | | | 7.29E−13 | 4.30E−12 |
| D8l | | | −3.80E−17 | −5.11E−16 |
| D10l | | | 1.95E−21 | 4.00E−20 |

In this embodiment, the light entrance surface (first surface) and the light exit surface (second surface) of the first imaging lens $6a$ are formed by an aspherical shape (non-arcuate shape) expressed by a function up to the tenth order in the main-scan section (main-scan direction).

On the other hand, in the sub-scan section (sub-scan direction), the light entrance surface (first surface) is formed by a spherical shape, while the light exit surface (second surface) is formed by a spherical shape where the curvature changes towards the main-scan direction.

The light entrance surface (third surface) and the light exit surface (fourth surface) of the second imaging lens $6b$ are formed by an aspherical shape (non-arcuate shape) expressed by a function up to the tenth order in the main-scan section.

On the other hand, in the sub-scan section (sub-scan direction), both of the light entrance surface (third surface) and the light exit surface (fourth surface) are formed by a spherical shape where the curvature changes towards the main-scan direction.

Then, the power in the sub-scan section decreases along the main-scan direction from the optical axis to the off-axis, by which the field curvature in the sub-scan direction can be well adjusted.

In this embodiment as described above, the first and second imaging lenses $6a$ and $6b$ are made of a plastic material (resin). However, the material is not limited to a plastic material, and a glass material may be used.

FIG. 4A to FIG. 4D are diagrams illustrating geometric aberration in the present embodiment.

It is seen from FIGS. 4A-4D that respective aberration are adjusted to a practically satisfactory level. Also, it is seen that changes of the sub-scan magnification with the image height are suppressed to 2% of lower.

As thus described, a satisfactory imaging performance in which changes of the spot shape in the sub-scan direction with the image height are suppressed, is accomplished.

It should be noted that the change of the sub-scan magnification with the image height should be 10% or less and, more preferably, 5% or less.

Figure 5:
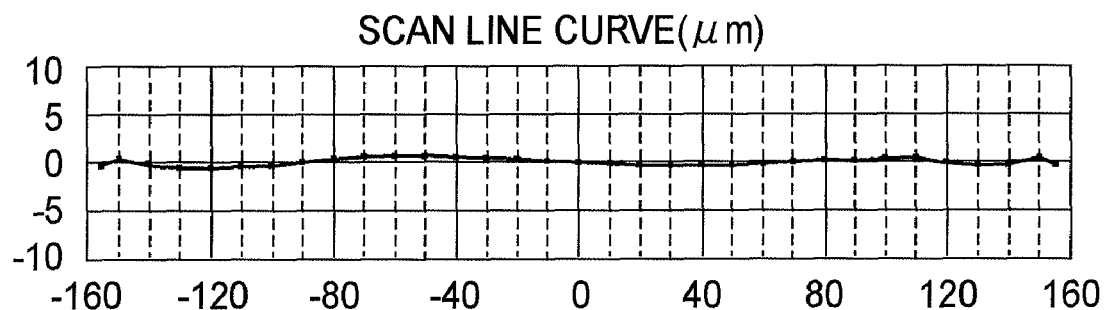
FIG. 5 is a diagram illustrating the mount of scan line curve in the first embodiment of the present invention.

FIG. 5 is a diagram illustrating the amount of scan line curve on the scan surface 7.

Figure 6:
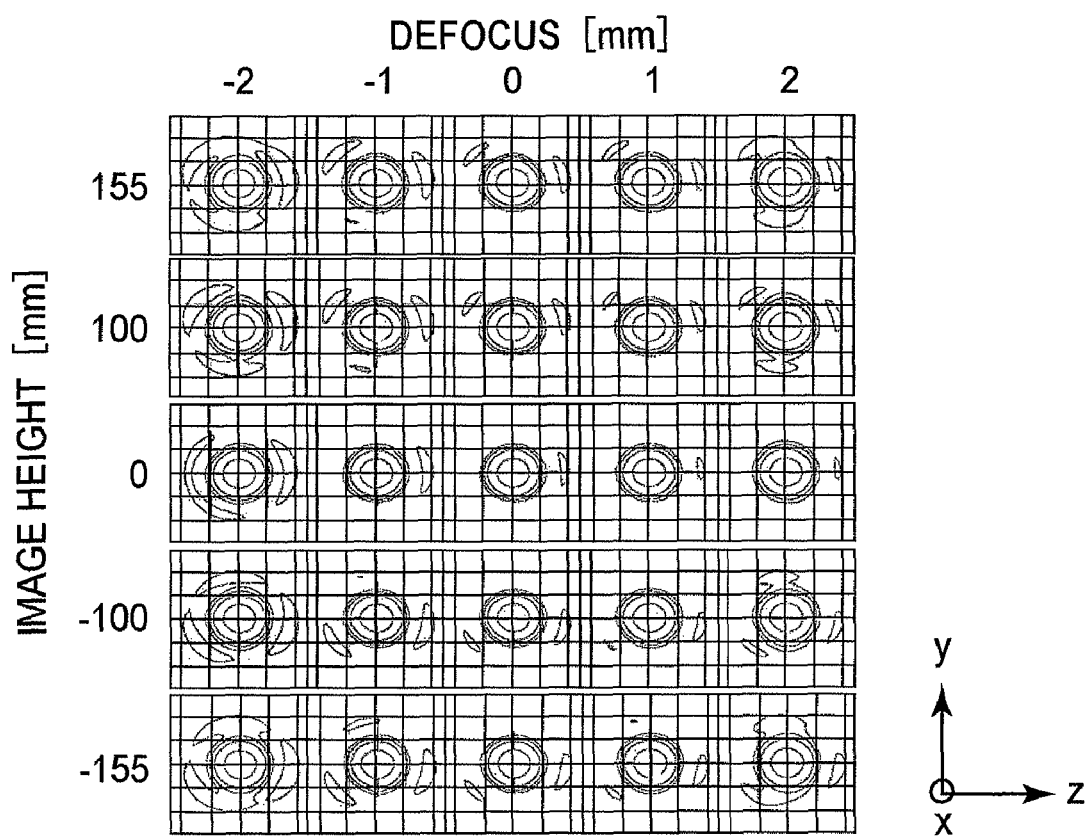
FIG. 6 is a diagram illustrating spot shapes in the first embodiment of the present invention.

FIG. 6 is a diagram illustrating imaging spots on the scan surface 7.

As a result of decentering the imaging lens 6b in the sub-scan direction, the light beam passes through a position close to the optical axis of the second imaging lens in the sub-scan section. Thus, the scan line curve and rotation of the imaging spot are restrained.

Hence, in a color image forming apparatus having an optical scanning device of the present embodiment, color drift can be well reduced.

Next, referring to FIG. 1 and FIG. 2, the structure and function for achieving an object of the present embodiment will be explained.

In this embodiment, in order to direct a plurality of light beams deflectively reflected by the same deflecting surface 5a (5b) of the optical deflector 5 toward a plurality of scan surfaces 7a and 7b (7c and 7d), respectively, as described hereinbefore, it is necessary to perform light ray division on the light path.

To this end, the light beams are obliquely incident in the sub-scan section on the same deflecting surface 5a (5b) of the optical deflector 5.

In such opposed scanning unit, as described above, the light reflected by the imaging lens surface of imaging lens may pass through the other imaging lens disposed symmetrically with respect to the optical deflector 5 and it may reach the other scan surface as unwanted light.

In consideration of this, the light beams are made obliquely incident on the same deflecting surface of the optical deflector in the sub-scan section, and an unwanted light blocking member is provided at a position spaced, in the sub-scan direction, from the light path of the scanning light beam scanningly deflected by the deflecting surface of the optical deflector and incident on scan surface. By this, unwanted light is prevented from reaching the scan surface.

However, due to the installation error of the imaging lens which produces the unwanted light, the unwanted light may shift largely in the sub-scan direction upon the unwanted light blocking member such that the unwanted light not intercepted by the unwanted light blocking member may reach the scan surface.

Figure 7:
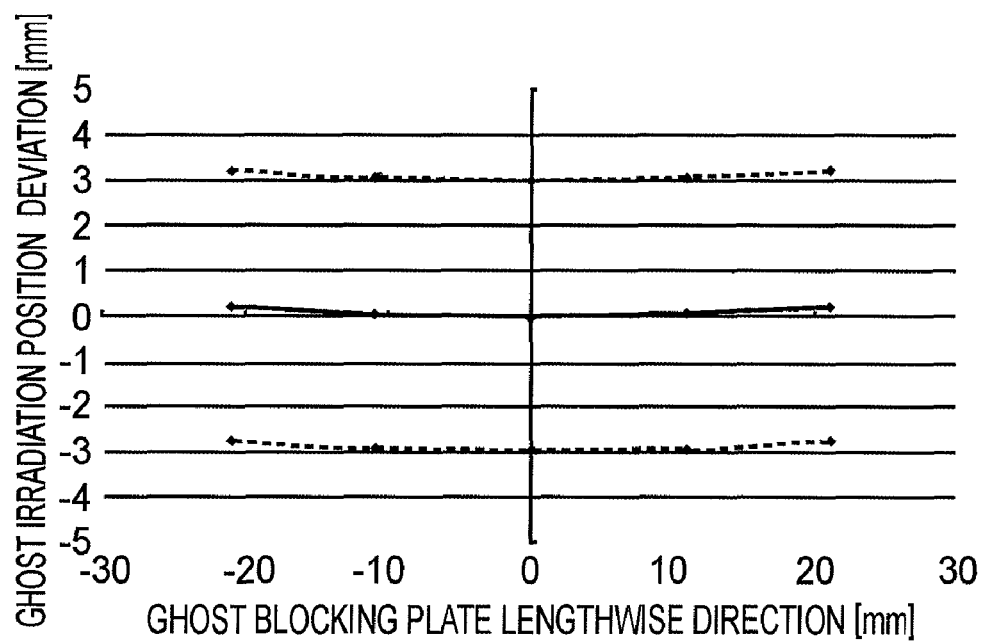
FIG. 7 is a diagram illustrating principal-ray irradiation positions of unwanted light upon a light blocking member, in a conventional optical scanning device.

FIG. 7 is a schematic diagram illustrating irradiation positions of the principal ray of unwanted light on the unwanted light blocking member, in a conventional optical scanning device.

In FIG. 7, a solid line depicts irradiation positions, on the unwanted light blocking member, of the principal ray of the unwanted light produced by an imaging lens surface.

Broken lines depict irradiation positions, on the unwanted light blocking member, of the principal ray of the unwanted light when the imaging lens tilts by ±30 minutes in the sub-scan section.

In the conventional optical scanning device, the power of imaging lens in the sub-scan section is zero (null).

It is see from FIG. 7 that, on the unwanted light blocking member, the unwanted light displaces as large as approximately by ±3 mm in the sub-scan section.

Figure 8:
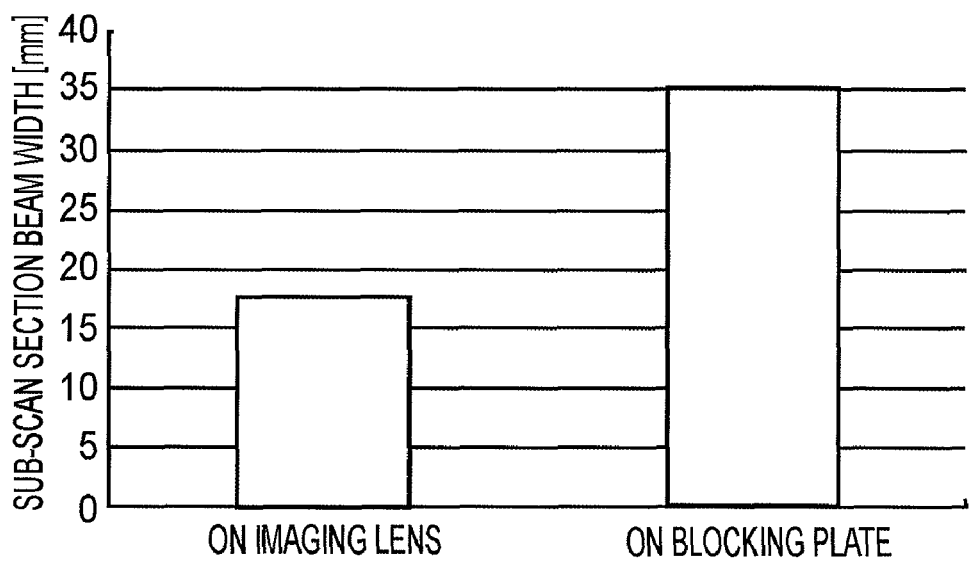
FIG. 8 is a diagram illustrating the beam width of unwanted light in a conventional optical scanning device.

FIG. 8 is a schematic diagram illustrating the light beam width in the sub-scan section, in a conventional optical scanning device, at the time before the unwanted light reaches the unwanted light blocking member (just after the transmission through the imaging lens) and at the time it reaches the unwanted light blocking member.

It is seen from FIG. 8 that the unwanted light is made into a divergent light in sub-scan section ray, before the unwanted light blocking member.

Since the unwanted light is diverged, it cannot be blocked completely unless a huge unwanted light blocking member is provided.

Furthermore, since the light beam width of the unwanted light is wide, it easily enters any other element and, additionally, irregular reflection may likely occur.

In the present embodiment in consideration of this, as shown in FIG. 2, the unwanted light Rf1 is caused to pass through an imaging lens 6a (6a') having a positive power in the sub-scan section (sub-scan direction), so that it is converted into a convergent light beam.

After that, the unwanted light is intercepted by an unwanted light blocking member 10a (10b).

As a result of this, even if there is an installation error of the imaging lens 6b (6b') including the imaging lens surface 6b2 (6b2') where unwanted light Rf1 is produced, large shift of the unwanted light upon the unwanted light blocking member 10a (10b) in the sub-scan direction can be assuredly prevented.

In this embodiment, unwanted light Rf1 may be produced by the reflection at the light exit surface 6b2 (6b2') of the imaging lens 6b (6b').

However, the unwanted light Rf1 from the light entrance surface 6b1 (6b1') of the imaging lens 6b (6b') passes through the imaging lens 6a (6a') and then it passes in the vicinity of the optical deflector 5.

Then, the unwanted light Rf1 passing in the vicinity of the optical deflector 5 is blocked by the unwanted light blocking member 10a (10b) which is provided at a side of the optical deflector 5 remote from the imaging lens 6a (6a').

Figure 9:
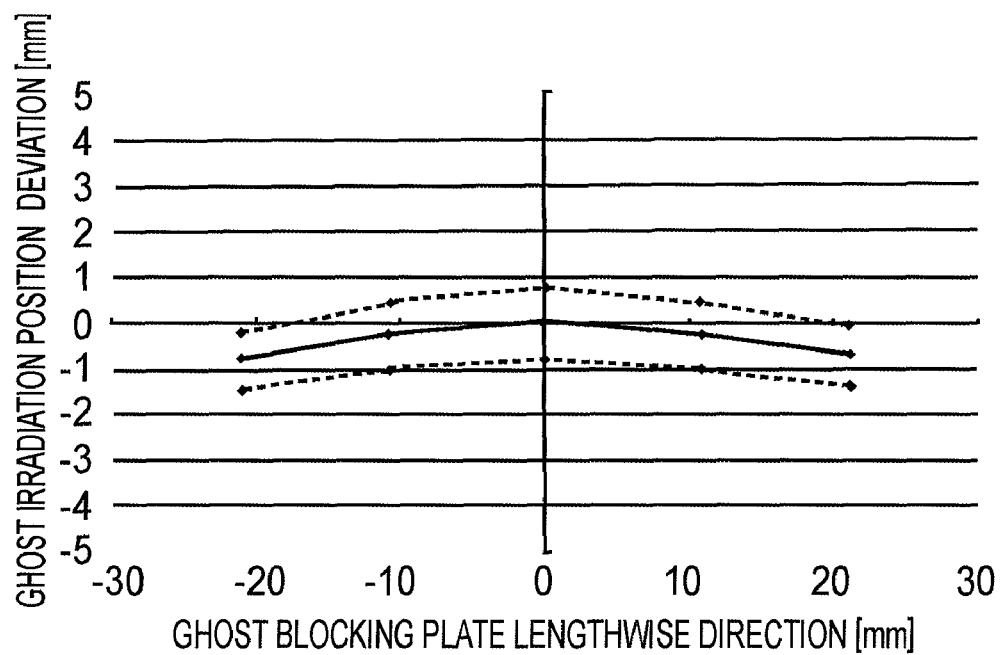
FIG. 9 is a diagram illustrating principal-ray irradiation positions of unwanted light in the optical scanning device of the first embodiment of the present invention.

FIG. 9 is a schematic diagram illustrating irradiation positions, on the unwanted light blocking member, of the principal ray of the unwanted light in the optical scanning device of the present embodiment.

In FIG. 9, a solid line depicts irradiation positions on unwanted light blocking member 10a (10b) of the principal ray of the unwanted light produced at the exit surface 6b2 (6b2') of the imaging lens 6b (6b'). Broken lines depict irradiation positions on the unwanted light blocking member 10a (10b) of the principal ray of the unwanted light when the imaging lens 6b (6b') tilts by ±30 minutes in the sub-scan section.

In the embodiment, the amount of fluctuation of the unwanted light in the sub-scan section is approximately ±0.8 mm, and it is seen that the amount of fluctuation of the unwanted light has decreased as compared with that in the conventional optical scanning device.

Such fluctuation amount as mentioned above can be sufficiently covered by the margin of the unwanted light blocking member 10a (10b).

Figure 10:
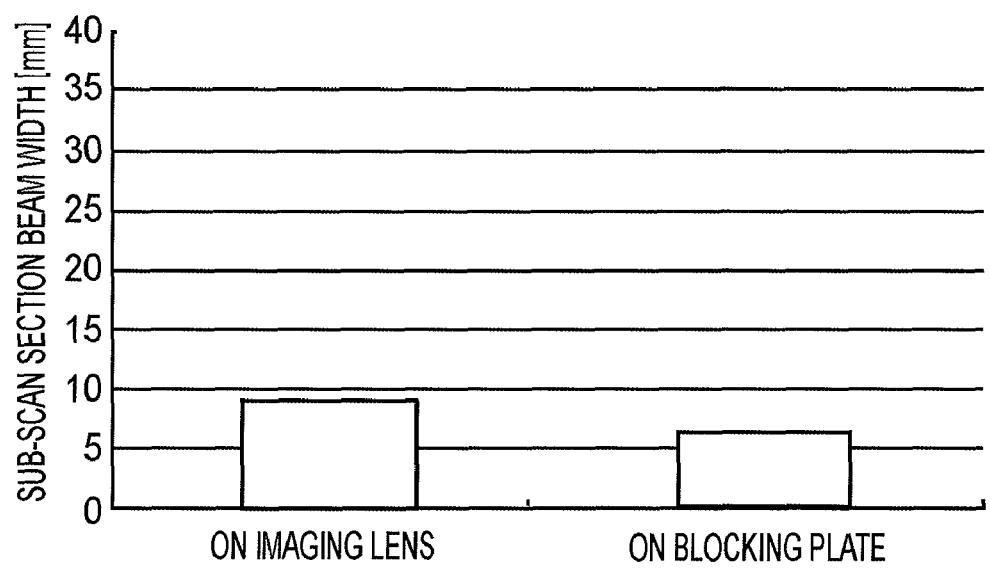
FIG. 10 is a diagram illustrating the beam width of unwanted light in the optical scanning device of the first embodiment of the present invention.

FIG. 10 is a schematic diagram illustrating the light beam width in the sub-scan section, in this embodiment, at the time before the unwanted light reaches the unwanted light blocking member (just after the transmission through the imaging lens 6a (6a')) and at the time it reaches the unwanted light blocking member.

It is seen from FIG. 10 that the unwanted light is made into a convergent light in sub-scan section ray, before the unwanted light blocking member.

Since the unwanted light is converged, the unwanted light can be intercepted effectively by a narrow surface range of the unwanted light blocking member 10a (10b).

In other words, even if the imaging lens 6b (6b') is tilted and decentered by approximately ±30 minutes in the sub-scan section by an installation error, for example, to cause tilt of unwanted light by about 1 degree, the unwanted light can still pass through the imaging lens 6a (6a') having a positive power in the sub-scan section.

Therefore, it does not largely shift in the sub-scan direction on the unwanted light blocking member 10a (10b).

In the embodiment, the refracting power of imaging lens 6a (6a') of the scanning unit U1 (U2) in the sub-scan section is denoted by $\phi s$, the distance from the light exit surface 6b2 (6b2') of the imaging lens 6b (6b') to the principal plane at the scan surface side of the imaging lens 6a (6a') is denoted by S1. Furthermore, the distance from the principal plane at the deflecting means side (optical deflector 5 side) of the imaging lens 6a (6a') to the unwanted light blocking member 10a (10b) is denoted by L. Then, the relationship below is satisfied.

$$(S1 \pm L) < S1 - L(S1 \cdot \phi s - 1) < (S1 + L) \quad (1)$$

Conditional expression (1) is the condition for that the unwanted light is effectively intercepted by the unwanted light blocking member without deteriorating the optical function.

If the upper limit of the conditional expression (1) is exceeded, the unwanted light can be largely shifted in sub-scan direction on the unwanted light blocking member, and it can disadvantageously reach the image plane.

If the lower limit of the conditional expression (1) is exceeded, the sub-scan magnification becomes too high, and the decentration sensitivity of the imaging optical system becomes disadvantageously high.

The parameter $\phi s$, S1 and L have the following values in the present embodiment.

$\phi s = 0.018$

S1=82.3 mm

L=72.5 mm

When these values are substituted into conditional expression (1), it follows that:

$-(S1+L) = -154.8$ mm $S1 - L(S1 \cdot \phi s - 1) = 47.4$ mm $(S1+L) = 154.8$ mm This satisfies conditional expression (1).

More preferably, conditional expression (1) had better be set as follows.

$$(S1+L)/2 \leq S1 - L(S1 \cdot \phi s - 1) < (S1+L)/2 \quad (1a)$$

It should be noted that, in the present embodiment, if the values of the parameters $\phi s$, S1 and L satisfy the following relationship, the advantageous effects of the present embodiment will be higher.

$0.001 \leq \phi s \leq 0.03$ $50 (mm) \leq S1 \leq 150$ (mm)

$30$ (mm) $\leq L \leq 300$ (mm)

More preferably, in the sub-scan section, based on the refracting power of the imaging lens 6a in sub-scan direction, a conjugate relationship should be provided between the imaging lens 6b and the unwanted light blocking member 10a.

Furthermore, as will be understood from FIG. 2, the unwanted light blocking member 10a (10b) in the present embodiment is disposed at a side of the imaging lens 6b (6b') (where the unwanted light is produced) which side is remote from the optical deflector 5.

As a result of this, the unwanted light can be intercepted at the position which is largely spaced, in the sub-scan direction, from the light path of the scanning light scanningly deflected by the deflecting surface of the optical deflector 5 and incident on the scan surface.

This assuredly avoids erroneous interception of the scanning light scanningly deflected by the deflecting surface of the optical deflector 5 and going to be incident on the scan surface.

In this embodiment as described above, unwanted light can be intercepted effectively even if there is an installation error of imaging lens.

Hence, in accordance with the present embodiment, an optical scanning device and a color image forming apparatus by which high-quality images can be made without image deterioration can be accomplished for a color LBP or a color copying machine and with a simple structure.

It should be noted that, although in the present example each of a plurality of light source means 1a and 1b is comprised of a single light emitting member (light emission point), the invention is not limited to this. It may be comprised of a plurality of light emitting members.

Furthermore, although in the present example the imaging optical system 6 (6') is comprised of two imaging optical elements (imaging lenses), the invention is not limited to this. It may be comprised of three or more imaging optical elements.

Furthermore, the imaging optical system 6 (6') may include a diffractive optical element.

Furthermore, although in this embodiment the fluctuation of the unwanted light caused by the installation error of the imaging lens where unwanted light is produced has been treated as an inconvenience, the invention is not limited to this. The present invention is effective also to fluctuation of the unwanted light due to an installation error of the input optical system or the deflecting means.

Embodiment 2

Figure 11:
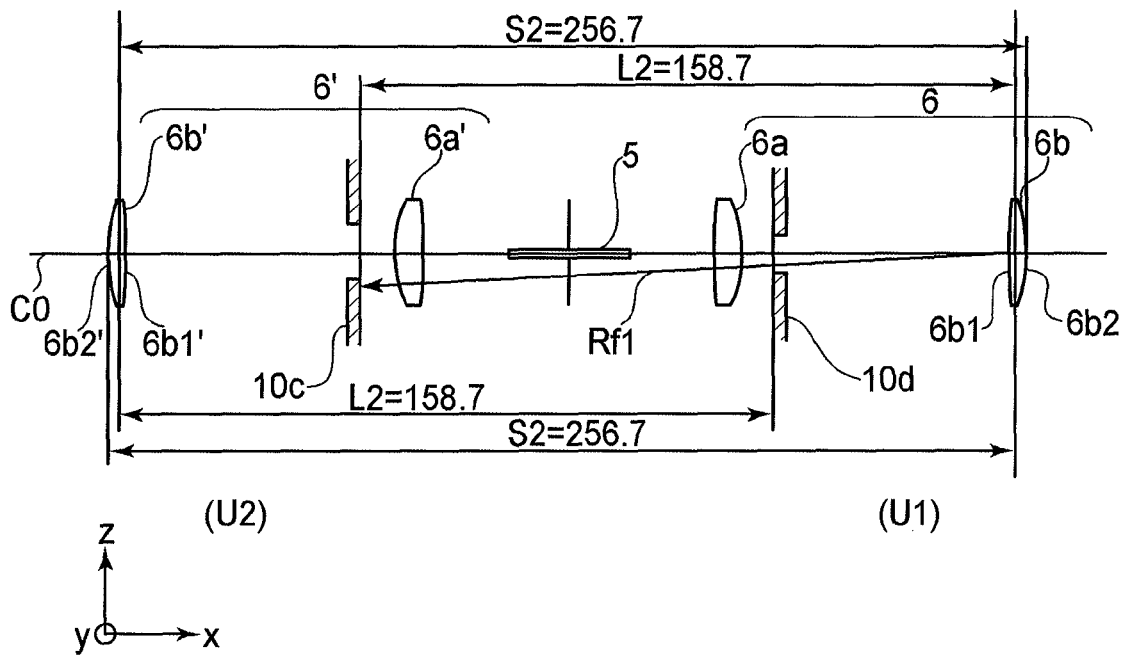
FIG. 11 is a sub-scan sectional view of a main portion of an optical scanning device according to a second embodiment of the present invention.

FIG. 11 is a sectional view in the sub-scan direction (sub-scan sectional view) of a main portion of a second embodiment of the present invention, wherein the light path is illustrated while being developed.

FIG. 11 illustrates the state in which unwanted light reflected at the optical surface of an imaging optical element is blocked by an unwanted light blocking member.

In FIG. 11, like numerals are assigned to components corresponding to those of FIG. 2.

This embodiment differs from the previous first embodiment in that the position where the unwanted light blocking member 10d (10c) is disposed is changed into the imaging optical system, and that there are two imaging lenses provided through which the unwanted light passes.

The structure and optical function of the remaining portion are similar to the first embodiment, and hence similar advantageous results are obtained.

More specifically, this embodiment differs from the first embodiment in that, in the sub-scan section, the first light blocking member 10d is disposed between the first imaging optical element 6a and the second imaging optical element 6b.

Furthermore, the second light blocking member 10c is disposed between the third imaging optical element 6a' and the fourth imaging optical element 6b'.

What is described above is different from first embodiment.

In this embodiment, like the abovementioned first embodiment, there occurs unwanted light Rf1 by reflection at the light exit surface 6b2 (6b2') of the second imaging lens 6b (6b').

However, the unwanted light Rf1 from the light entrance surface 6b1 (6b1') of the imaging lens 6b (6b') passes through the imaging lens 6a (6a'), and then it passes near the optical deflector 5. The unwanted light Rf1 passing in the vicinity of the optical deflector 5 then passes through the imaging lens 6a' (6a) at the other side and, finally, it is intercepted by the unwanted light blocking member 10c (10d) which is provided at a side of the imaging lens 6a (6a') remote from the optical deflector 5.

Furthermore, even if the imaging lens 6b (6b') is tilted and decentered by approximately ±30 minutes in the sub-scan section by an installation error, for example, to cause tilt of unwanted light by about 1 degree, the unwanted light Rf1 can still pass through the imaging lenses 6a and 6a' (6a' and 6a) having a positive power in the sub-scan section.

Therefore, it does not largely shift in the sub-scan direction on the unwanted light blocking member 10d (10d).

Furthermore, in comparison with first embodiment, the number of imaging lenses having a positive power in sub-scan section through which the unwanted light Rf1 passes is made larger.

Thus, the amount of fluctuation of the unwanted light Rf1 in the sub-scan direction is reduced more.

Figure 12:
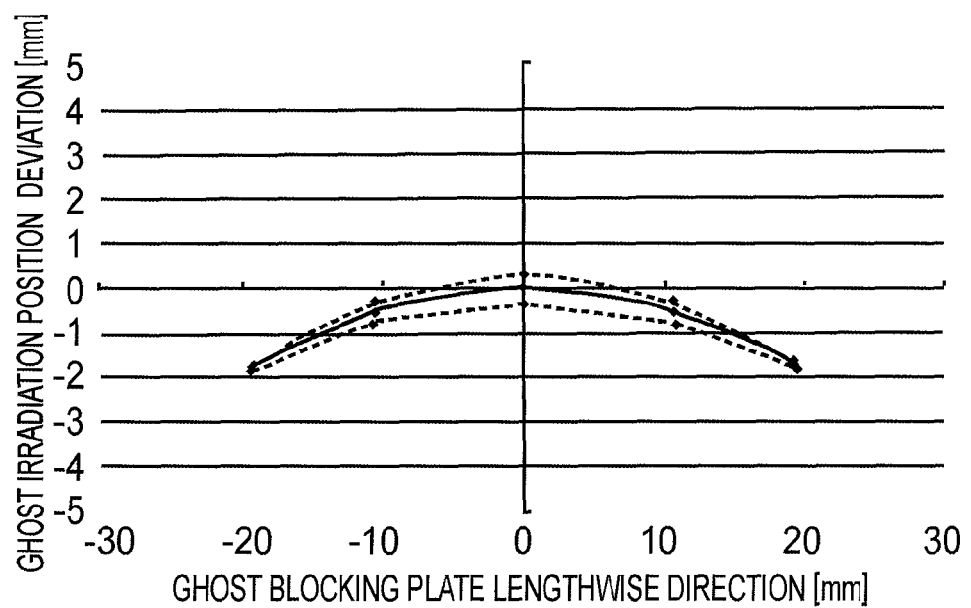
FIG. 12 is a diagram illustrating principal-ray irradiation positions of unwanted light in the optical scanning device of the second embodiment of the present invention.

In FIG. 12, a solid line depicts irradiation positions on the unwanted light blocking member 10c (10d) of the principal ray of the unwanted light Rf1 produced by the reflection at the imaging lens surface 6b2 (6b2') of the present embodiment.

Broken lines depict irradiation positions on the unwanted light blocking member 10c (10d) of the principal ray of the unwanted light Rf1 when the imaging lens 6b (6b') where the unwanted light Rf1 is produced tilts by ±30 minutes in the sub-scan section.

In the embodiment, the amount of fluctuation of the unwanted light Rf1 in the sub-scan section is approximately ±0.4 mm, and it is seen that the amount of fluctuation of the unwanted light has decreased more as compared with that of the optical scanning device of the first embodiment.

Such fluctuation amount as mentioned above can be sufficiently covered by the margin of the unwanted light blocking member 10c (10d).

Figure 13:
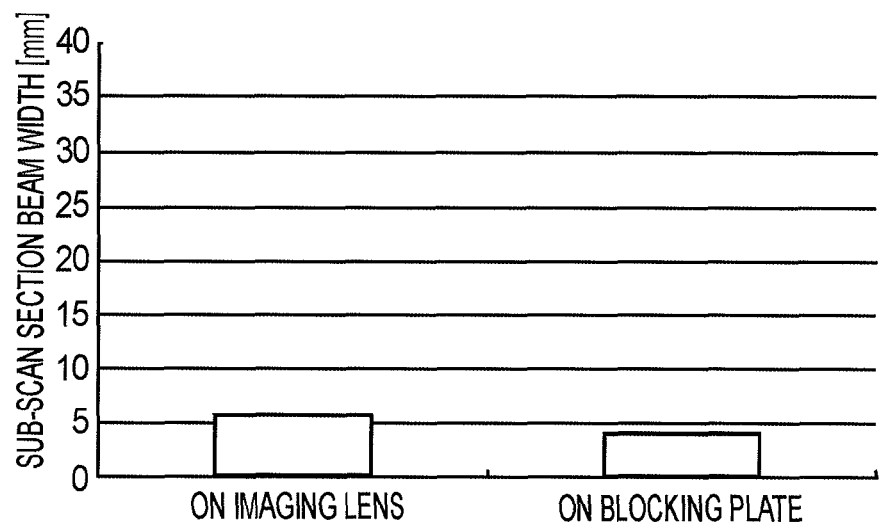
FIG. 13 is diagram illustrating the beam width of unwanted light in the optical scanning device of the second embodiment of the present invention.

FIG. 13 is a schematic diagram illustrating the light beam width of the unwanted light in the sub-scan section, in this embodiment, at the time before the unwanted light Rf1 reaches the unwanted light blocking member (just after the transmission through the imaging lens 6a' (6a)) and at the time it reaches the unwanted light blocking member.

It is seen from FIG. 13 that the unwanted light is made into a convergent light in sub-scan section ray, before the unwanted light blocking member.

Since the unwanted light is converged, the unwanted light can be intercepted effectively by a narrow surface range of the unwanted light blocking member 10c (10d).

In other words, even if the imaging lens 6b (6b') is tilted and decentered by approximately ±30 minutes in the sub-scan section by an installation error, for example, to cause tilt of unwanted light by about 1 degree, the unwanted light can still pass through the imaging lenses 6a and 6a' (6a' and 6a) having a positive power in the sub-scan section.

Therefore, it does not largely shift in the sub-scan direction on the unwanted light blocking member 10c (10d).

In this embodiment, the combined refracting power of the imaging lens (first imaging lens) 6a (6a') inside one scanning unit U1 and the imaging lens (third imaging lens) 6a' (6a) inside the other scanning unit U2, in the sub-scan section, is denoted by $\phi p$ ($\phi s$).

The distance from the light exit surface 6b2 (6b2') of the imaging lens 6b (6b') to the front principal plane (principal plane at the scan surface 7a or 7b side) of a composite system which is comprised of the imaging lens 6a (6a') of the scanning unit U1 and the imaging lens 6a' (6a) of the scanning unit U2 is denoted by S2 (S1).

Furthermore, the distance from the rear principal plane (principal plane at the optical deflector 5 side) of the composite system which is comprised of the imaging lens 6a (6a') of the scanning unit U1 and the imaging lens 6a' (6a) of the scanning unit U2 to the unwanted light blocking member 10c (10d) is denoted by L2 (L).

Here, the relationship below is satisfied.

$$-(S2+L2)<S2-L2(S2\cdot\phi p-1)<(S2+L2) \quad (2)$$

Conditional expression (2) is the condition for that the unwanted light is effectively intercepted by the unwanted light blocking member without deteriorating the optical function.

If the upper limit of the conditional expression (2) is exceeded, the unwanted light can be largely shifted in sub-scan direction on the unwanted light blocking member, and it can disadvantageously reach the image plane.

If the lower limit of the conditional expression (2) is exceeded, the sub-scan magnification becomes too high, and the decentration sensitivity of the imaging optical system becomes disadvantageously high.

The parameter $\phi p$, S2 and L2 have the following values in the present embodiment.

$\phi p=0.009$ $S2=256.7$ mm $L2=158.7$ mm

When these values are substituted into conditional expression (2), it follows that:

$-(S2+L2)=-442.4$ mm $S2-L2(S2\cdot\phi p-1)=23.7$ mm $(S2+L2)=442.4$ mm

This satisfies conditional expression (2).

More preferably, conditional expression (2) had better be set as follows.

$$-(S2+L2)/2\leq S2-L2(S2\cdot\phi p-1)<(S2+L2)/2 \quad (2a)$$

It should be noted that, in the present embodiment, if the values of the parameters $\phi p$, S2 and L2 satisfy the following relationship, the advantageous effects of the present embodiment will be higher.

$0.001\leq\phi p\leq 0.02$ $100(\text{mm})\leq S2\leq 300(\text{mm})$ $100(\text{mm})\leq L2\leq 200(\text{mm})$ More preferably, in the sub-scan section, based on the composite refracting power of the imaging lens 6a and the imaging lens 6a' in sub-scan direction, a conjugate relationship should be provided between the imaging lens 6b and the unwanted light blocking member 10c.

Furthermore, as will be understood from FIG. 11, the unwanted light blocking member 10c (10d) in the present embodiment is disposed at a side of the imaging lens 6b (6b') (where the unwanted light is produced) which side is remote from the optical deflector 5.

As a result of this, the unwanted light can be intercepted at the position which is largely spaced, in the sub-scan direction, from the light path of the scanning light scanningly deflected by the deflecting surface of the optical deflector 5 and incident on the scan surface.

This assuredly avoids erroneous interception of the scanning light scanningly deflected by the deflecting surface of the optical deflector 5 and going to be incident on the scan surface.

In this embodiment as described above, unwanted light can be intercepted effectively even if there is an installation error of optical elements.

Hence, in accordance with the present embodiment, an optical scanning device and a color image forming apparatus by which high-quality images can be made without image deterioration can be accomplished for a color LBP or a color copying machine and with a simple structure.

Furthermore, although in this embodiment the fluctuation of the unwanted light caused by the installation error of the imaging lens where unwanted light is produced has been treated as an inconvenience, the invention is not limited to this. The present invention is effective also to fluctuation of the unwanted light due to an installation error of the input optical system or the deflecting means.

Embodiment 3

Figure 14:
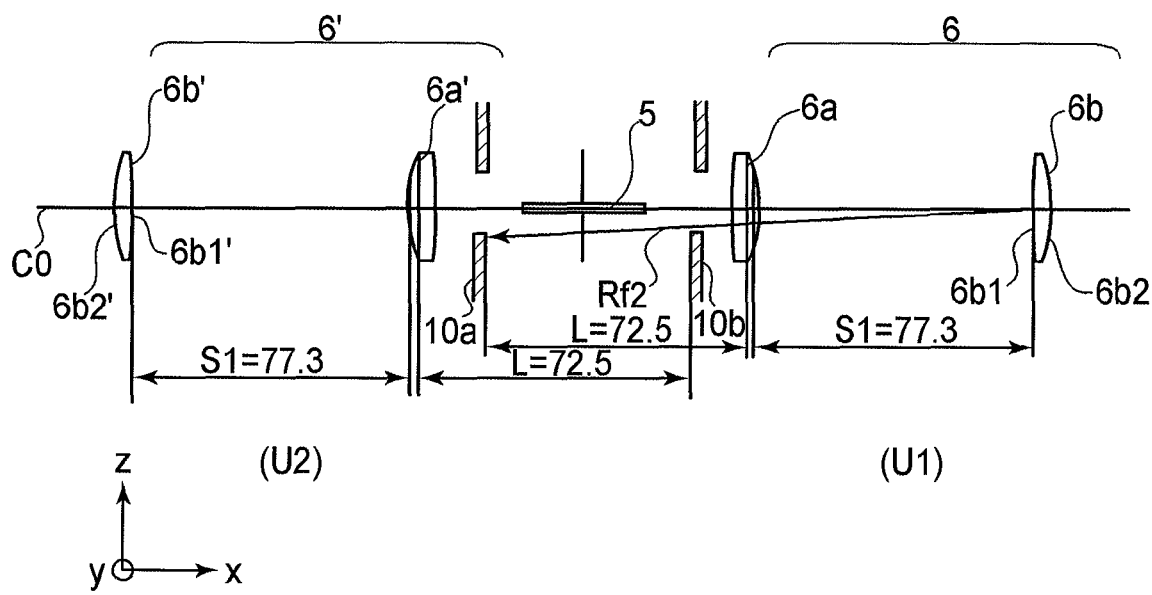
FIG. 14 is a sub-scan sectional view of a main portion of an optical scanning device according to a third embodiment of the present invention.

FIG. 14 is a sectional view in the sub-scan direction (sub-scan sectional view) of a main portion of a third embodiment of the present invention, wherein the light path is illustrated while being developed.

FIG. 14 illustrates the state in which unwanted light reflected at the optical surface of an imaging optical element is blocked by an unwanted light blocking member.

In FIG. 14, like numerals are assigned to components corresponding to those of FIG. 2.

This embodiment differs from the aforementioned first embodiment in the point of the lens surface shape of the second imaging lens 6b (6b') where unwanted light is produced.

The structure and optical function of the remaining portion are similar to the first embodiment, and hence similar advantageous results are obtained.

In this embodiment, unlike the abovementioned first embodiment, there occurs unwanted light Rf2 by reflection at the light entrance surface 6b1 (6b1') of the second imaging lens 6b (6b').

However, the unwanted light Rf2 reflected by the light entrance surface 6b1 (6b1') of the imaging lens 6b (6b') passes through the imaging lens 6a (6a'), and then it passes near the optical deflector 5.

The unwanted light Rf2 passing in the vicinity of the optical deflector 5 is intercepted by the unwanted light blocking member 10a (10b) which is provided at a side of the imaging lens 6a (6a') remote from the optical deflector 5.

Furthermore, even if the imaging lens 6b (6b') is tilted and decentered by approximately ±30 minutes in the sub-scan section by an installation error, for example, to cause tilt of unwanted light by about 1 degree, the unwanted light Rf2 can still pass through the imaging lens 6a (6a') having a positive power in the sub-scan section.

Therefore, it does not largely shift in the sub-scan direction on the unwanted light blocking member 10a (10b).

Figure 15:
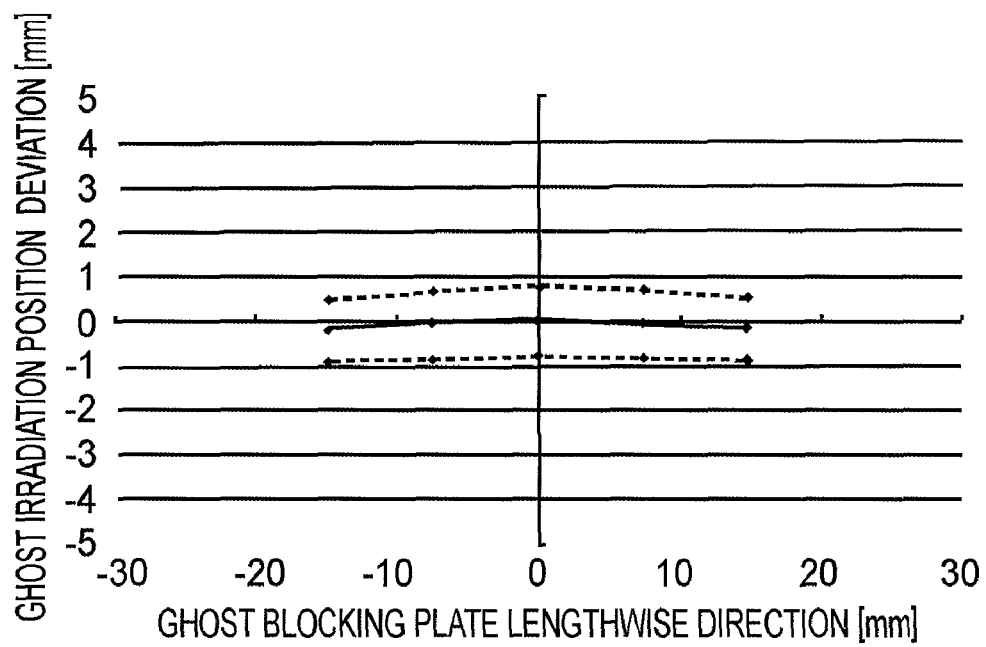
FIG. 15 is a diagram illustrating principal-ray irradiation positions of unwanted light in the optical scanning device of the third embodiment of the present invention.

In FIG. 15, a solid line depicts irradiation positions on the unwanted light blocking member 10a (10b) of the principal ray of the unwanted light Rf2 produced by the reflection at the imaging lens surface 6b1 (6b1') of the present embodiment.

Broken lines depict irradiation positions on the unwanted light blocking member 10a (10b) of the principal ray of the unwanted light Rf1 when the imaging lens 6b (6b') where the unwanted light Rf2 is produced tilts by ±30 minutes in the sub-scan section.

In the embodiment, the amount of fluctuation of the unwanted light Rf2 in the sub-scan section is approximately ±0.8 mm, and it is seen that the amount of fluctuation of the unwanted light Rf2 has decreased as in the first embodiment.

Such fluctuation amount as mentioned above can be sufficiently covered by the margin of the unwanted light blocking member 10c (10d).

Figure 16:
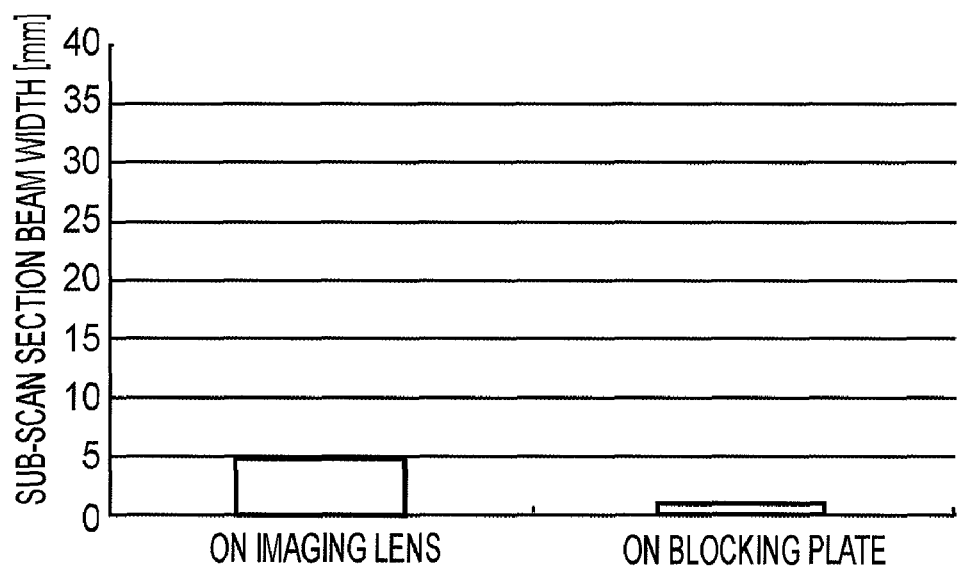
FIG. 16 is a diagram illustrating the beam width of unwanted light in the optical scanning device of the third embodiment of the present invention.

FIG. 16 is a schematic diagram illustrating the light beam width of the unwanted light in the sub-scan section, in this embodiment, at the time before the unwanted light Rf2 reaches the unwanted light blocking member (just after the transmission through the imaging lens 6a (6a')) and at the time it reaches the unwanted light blocking member.

It is seen from FIG. 16 that the unwanted light Rf2 is made into a convergent light in sub-scan section ray, before the unwanted light blocking member 10a (10b).

Since the unwanted light is converged, the unwanted light can be intercepted effectively by a narrow surface range of the unwanted light blocking member.

In other words, even if the imaging lens 6b (6b') is tilted and decentered by approximately ±30 minutes in the sub-scan section by an installation error, for example, to cause tilt of unwanted light by about 1 degree, the unwanted light can still pass through the imaging lens 6a (6a') having a positive power in the sub-scan section.

Therefore, it does not largely shift in the sub-scan direction on the unwanted light blocking member 10a (10b).

In this embodiment, the refracting power $\phi s$ of the imaging lens 6a (6a') inside the scanning unit U1 (U2') is set as follows.

Furthermore, the distance S1 from the surface 6b1 (6b1') of the imaging lens 6b (6b') to the principal plane at the scan surface side of the imaging lens 6a (6a') is set as follows.

Furthermore, the distance L from the principal plane at the deflection means side (optical deflector 5 side) of the imaging lens 6a (6a') to the unwanted light blocking member 10a (10b) is set as follows.

$\phi s = 0.009$ $S1 = 77.3$ mm $L = 72.5$ mm

When these values are substituted into conditional expression (1), it follows that:

$(S1+L) = -149.8$ mm $S1 - L(S1 \cdot \phi s - 1) = 99.4$ mm $(S1+L) = 149.8$ mm This satisfies conditional expression (1).

Furthermore, as will be understood from FIG. 14, the unwanted light blocking member 10a (10b) in the present embodiment is disposed at a side of the imaging lens 6b (6b') (where the unwanted light is produced) which side is remote from the optical deflector 5.

As a result of this, the unwanted light can be intercepted at the position which is largely spaced, in the sub-scan direction, from the light path of the scanning light scanningly deflected by the deflecting surface of the optical deflector 5 and incident on the scan surface.

This assuredly avoids erroneous interception of the scanning light scanningly deflected by the deflecting surface of the optical deflector 5 and going to be incident on the scan surface.

In this embodiment as described above, unwanted light can be intercepted effectively even if there is an installation error of optical elements.

Hence, in accordance with the present embodiment, an optical scanning device and a color image forming apparatus by which high-quality images can be made without image deterioration can be accomplished for a color LBP or a color copying machine and with a simple structure.

It should be noted that the unwanted light blocking member 10a (10b) may be disposed between the first imaging lens 6a' (6a) and the second imaging lens 6b' (6b) of the scanning unit U2 (U1) as in the previous second embodiment.

Furthermore, although in this embodiment the fluctuation of the unwanted light caused by the installation error of the imaging lens where unwanted light is produced has been treated as an inconvenience, the invention is not limited to this. The present invention is effective also to fluctuation of the unwanted light due to an installation error of the input optical system or the deflecting means.

Embodiment of Image Forming Apparatus

Figure 17:
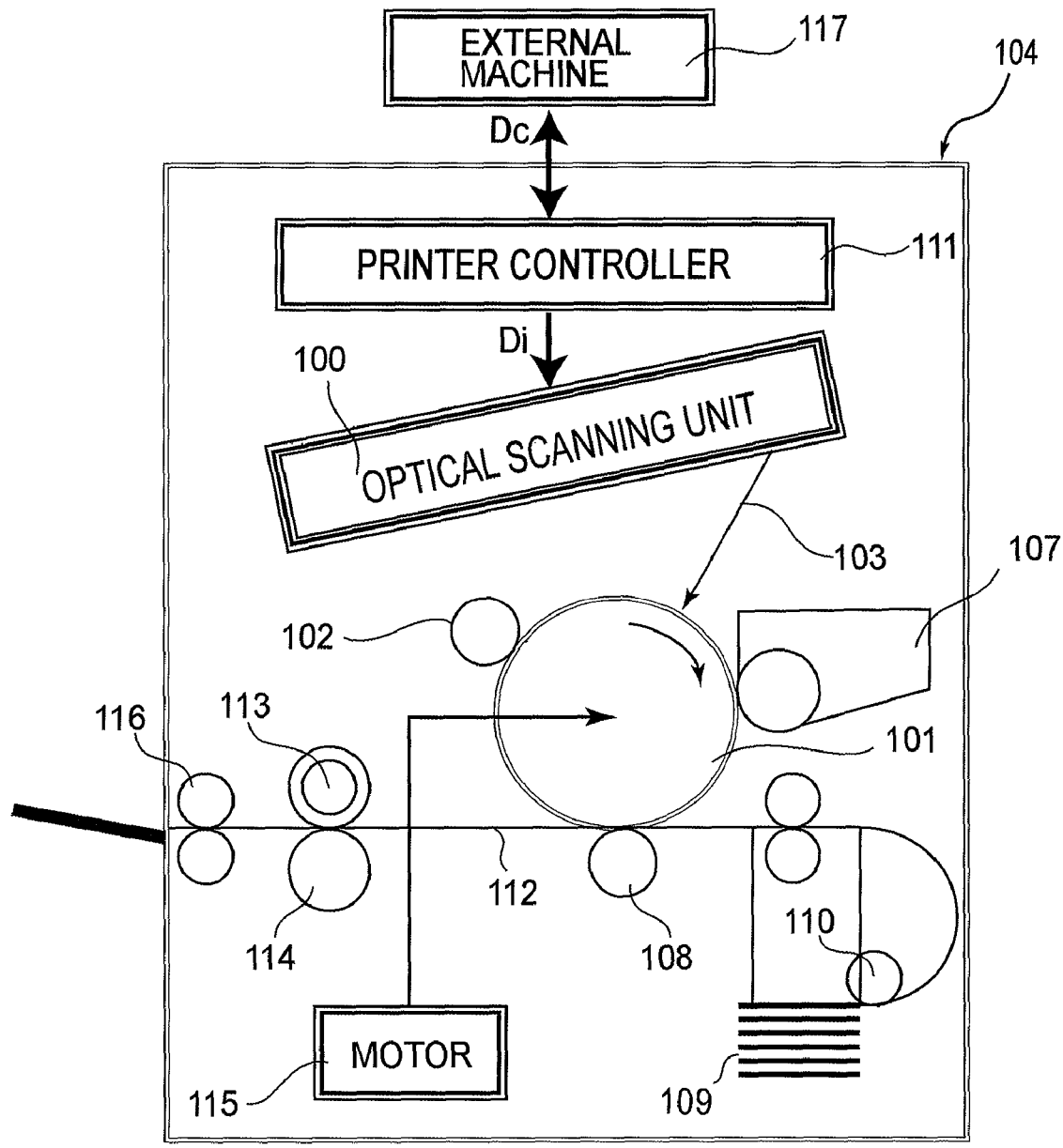
FIG. 17 is a schematic diagram of a main portion of an image forming apparatus according to an embodiment of the present invention.

FIG. 17 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 17) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 17) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 17, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

Embodiment of Color Image Forming Apparatus

Figure 18:
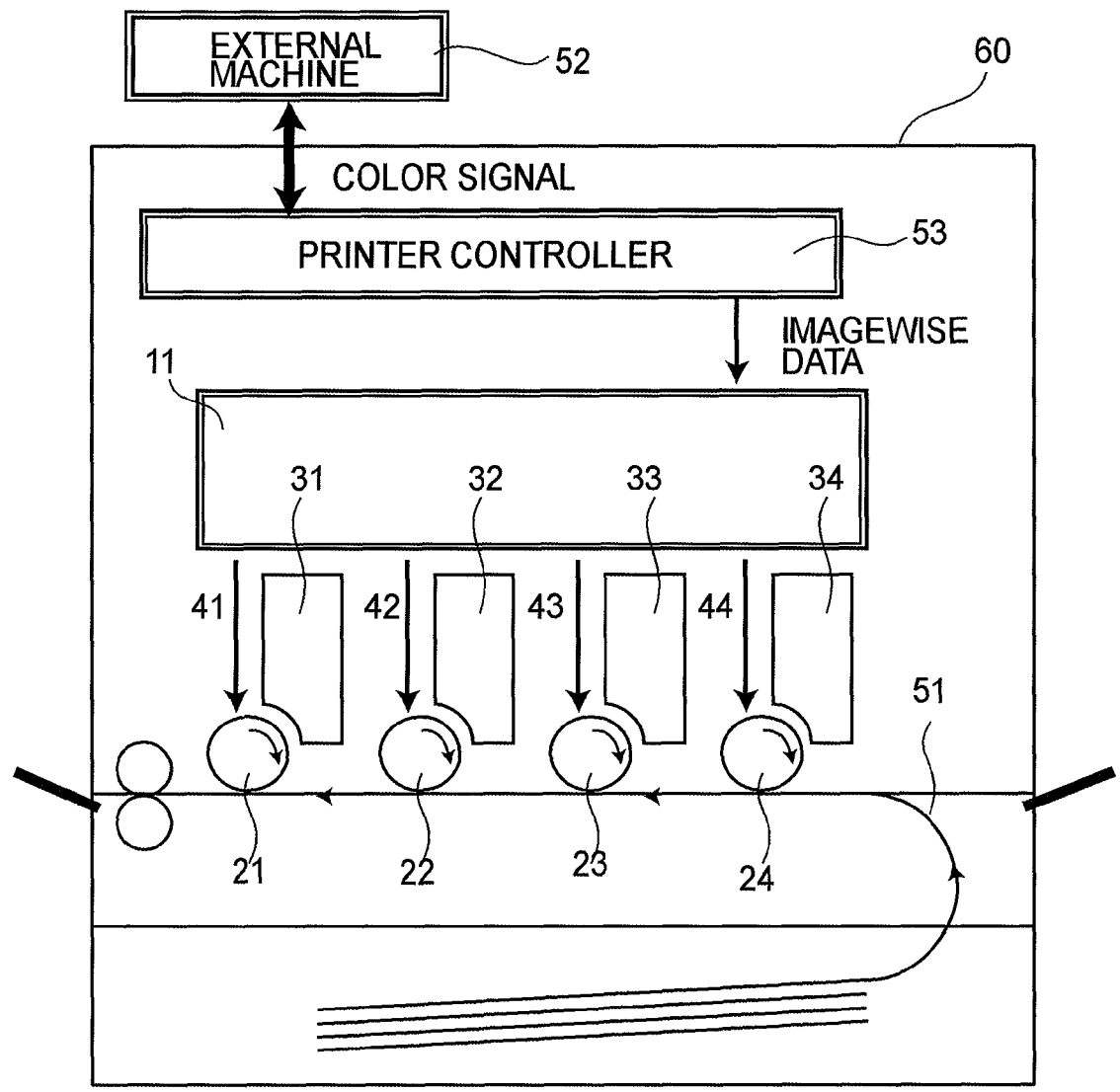
FIG. 18 is a schematic diagram of a main portion of a color image forming apparatus according to an embodiment of the present invention.
Figure 19:
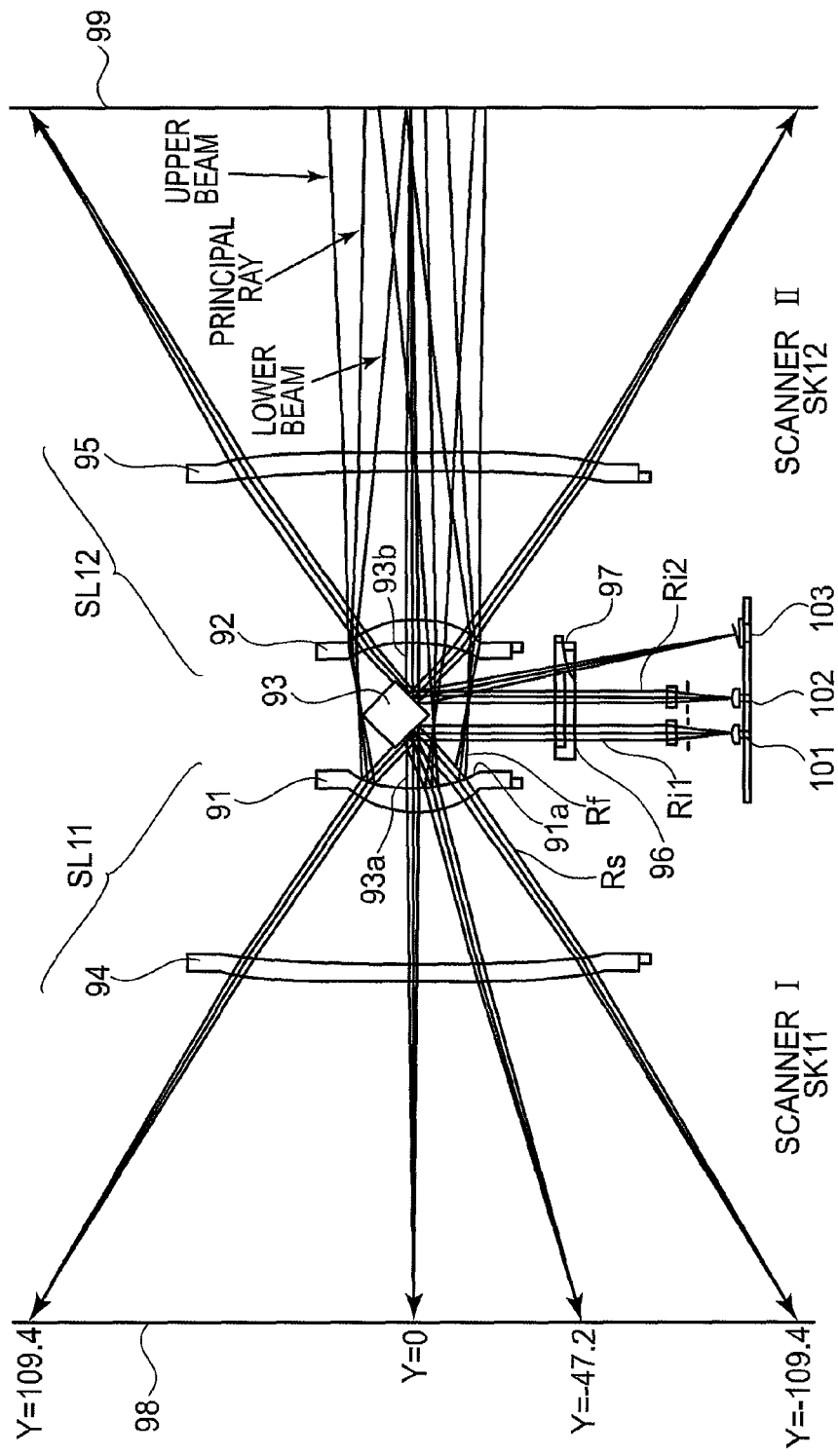
FIG. 19 is a main-scan sectional view of a conventional optical scanning device.
Figure 20:
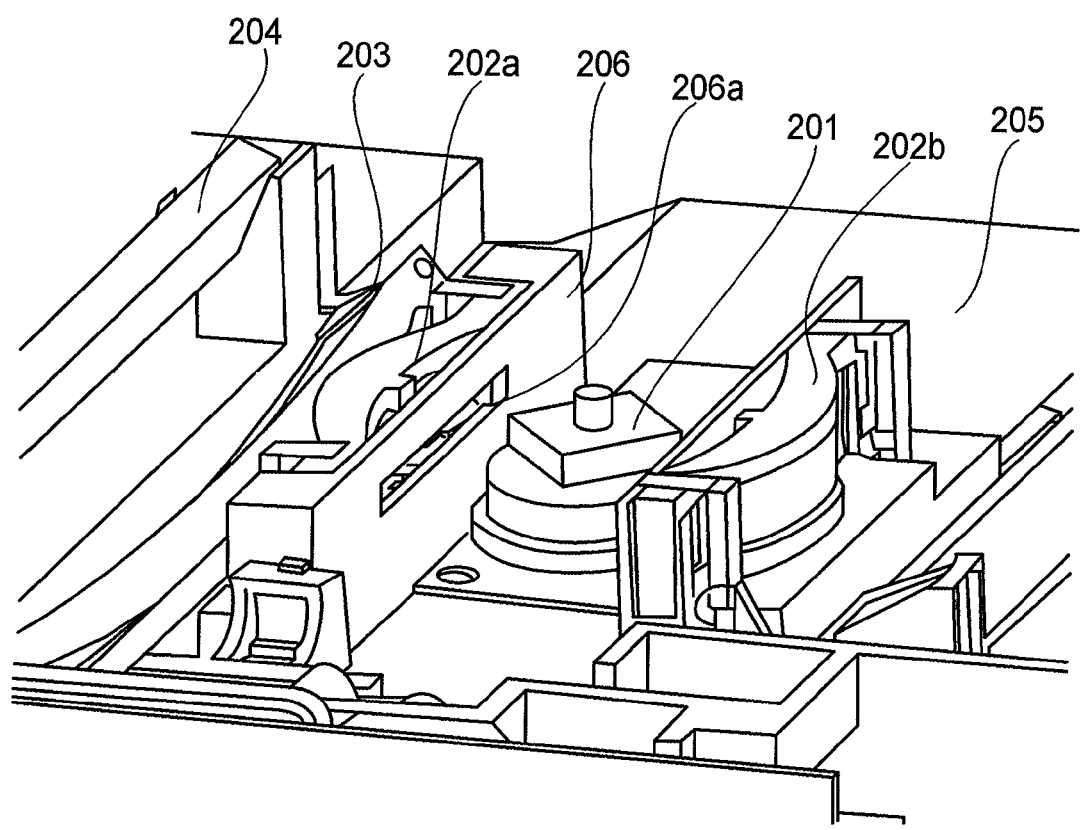
FIG. 20 is a perspective view of a main portion of a conventional optical scanning device.

FIG. 18 is a schematic view of a main portion of a color image forming apparatus according to an embodiment of the present invention. This embodiment is directed to a tandem type color image forming apparatus in which four optical scanning devices (multi-beam optical scanning devices) are provided so as to record imagewise data upon the surfaces of corresponding photosensitive drums (image bearing members) in parallel to each other.

In FIG. 18, denoted generally at 100 is a color image forming apparatus, and denoted at 11 is an optical scanning device having a structure according to any one of the preceding embodiments. Denoted at 21, 22, 23 and 24 are photosensitive drums (image bearing members), and denoted at 31, 32, 33 and 34 are developing devices, respectively. Denoted at 51 is a conveyance belt.

In FIG. 18, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and B (black).

These imagewise data are inputted into the optical scanning device 11. In response, the optical scanning device produces light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the color image forming apparatus of this embodiment, the optical scanning device 11 scans four light beams which correspond to colors of C (cyan), M (magenta), Y (yellow) and B (black) respectively. Imagewise signals are recorded on the surfaces of the photosensitive drums 21, 22, 23 and 24, respectively, so that a color image can be printed at high speed.

As described, the color image forming apparatus of this embodiment uses an optical scanning device 11 by which latent images for different colors are formed upon the surfaces of corresponding photosensitive drums 21, 22, 23 and 24, respectively, using the light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 100 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-031521 filed Feb. 13, 2008, for which is hereby incorporated by reference.

What is claimed is:

1. An optical scanning device, comprising:
   two scanning units each having an input optical system configured, in a sub-scan section. to make a light beam from a light source means be incident at a finite angle on a deflecting surface of deflecting means which is arranged to scanningly deflect a light beam from said light source means, and an imaging optical system configured to image, on a scan surface to be scanned, the light beam scanningly deflected by the deflecting surface of said deflecting means, said two scanning units being disposed opposed to each other with said deflecting means intervening therebetween;
   wherein one scanning unit of said two scanning units has at least two imaging optical elements including a first imaging optical element and a second imaging optical element disposed. in this order from said deflecting means,
   wherein the other scanning unit of said two scanning units has at least two imaging optical elements including a third imaging optical element and a fourth imaging optical element disposed in this order from said deflecting means,
   wherein said one scanning unit includes a first light blocking member configured to intercept unwanted light reflected at an optical surface of said fourth imaging optical element and directed to the scan surface at one scanning unit side,
   wherein said third imaging optical element of said other scanning unit is provided at a light path between said fourth imaging optical element and said first light blocking member,
   wherein an optical surface of said third imaging optical element through which unwanted light reflected at the optical surface of said fourth imaging optical element and directed to the scan surface at the one scanning unit side passes has a positive refracting rower in the sub-scan section,
   wherein, in the sub-scan section, said first light blocking member is disposed at the light path between said deflecting means and said first imaging optical element, and
   wherein, when a combined refracting power in the sub-scan section of said third imaging optical element is φs, a distance from the optical surface of said fourth imaging optical element where the unnecessary light is produced to a rear principal plane of said third imaging optical element in the sub-scan section is S1, a distance from a front principal plane of said third imaging optical element in the sub-scan section to said first light blocking member is L, a condition $$-(S1+L)/2 < S1 - L(S1 \cdot \phi s - 1) < (S1+L)/2$$

is satisfied.

2. An optical scanning device according to claim 1, wherein the unnecessary light incident on said first light blocking member and intercepted thereby is a convergent light beam in the sub-scan section.

3. An optical scanning device according to claim 1, wherein said two scanning units are configured so that light beams scanningly deflected by the same deflecting surface of said deflecting means are image on different scan surfaces.

4. An optical scanning device according to claim 1, wherein said other scanning unit includes a second light blocking member configured to intercept unwanted light reflected at an optical surface of said second imaging optical element and directed to the scan surface at the other scanning unit side, wherein said first imaging optical element of said one scanning unit is provided at a light path between said second imaging optical element and said second light blocking member, and wherein said first imaging optical element has a positive refracting power in the sub-scan section in which the unwanted light reflected at the optical surface of said second imaging optical element and directed to the scan surface at the other scanning unit side passes.

5. An image forming apparatus, comprising:
   an optical scanning device as recited in claim 1;
   a photosensitive member disposed at said scan surface;
   a developing device configured to develop an electrostatic latent image formed on said photosensitive member by a light beam scanned by said optical scanning device, into a toner images;
   a transfer unit configured to transfer a developed toner image to a transfer material; and
   a fixing device configured to fix the transferred toner images on the transfer material.

6. An image forming apparatus, comprising:
an optical scanning device as recited in claim 1; and
a printer controller for converting code data supplied from an outside machine into an imagewise signal and for inputting the imagewise signal into said optical scanning device.

7. A color image forming apparatus, comprising:
an optical scanning device as recited in claim 1; and
a plurality of image bearing members each being disposed at a surface to be scanned by said optical scanning device, for forming images of different colors.

8. A color image forming apparatus according to claim 7, further comprising a printer controller for converting a color signal supplied from an outside machine into imagewise data of different colors and for inputting the imagewise data into corresponding optical scanning devices.

9. An optical scanning device, comprising:
two scanning units each having an input optical system configured, in a sub-scan section, to make a light beam from a light source means be incident at a finite angle on a deflecting surface of deflecting means which is arranged to scanningly deflect a light beam from said light source means, and an imaging optical system configured to image, on a scan surface to be scanned, the light beam scanningly deflected by the deflecting surface of said deflecting means, said two scanning units being disposed opposed to each other with said deflecting means intervening therebetween;
wherein one scanning unit of said two scanning units has at least two imaging optical elements including a first imaging optical element and a second imaging optical element disposed in this order from said deflecting means,
wherein the other scanning unit of said two scanning units has at least two imaging optical elements including a third imaging optical element and a fourth imaging optical element disposed in this order from said deflecting means,
wherein said one scanning unit includes a first light blocking member configured to intercept unwanted light reflected at an optical surface of said fourth imaging optical element and directed to the scan surface at one scanning unit side,
wherein said third imaging optical element of said other scanning unit is provided at a light path between said fourth imaging optical element and said first light blocking member,
wherein, in the sub-scan section, said first light blocking member is disposed at a light path between said first imaging optical element and said second imaging optical element, and
wherein, when a combined refracting power in the sub-scan section of said first imaging optical element and said third imaging optical element is $\phi p$, a distance from the optical surface of said fourth imaging optical element of said other scanning unit where unwanted light is produced to a principal plane at the scan surface side of a synthetic system comprised of said first imaging optical element and said third imaging optical element is S2, and a distance from a principal plane at the deflecting means side of the synthetic system comprised of said first imaging optical element and said third imaging optical element to said first light blocking member is L2, a condition $-(S2+L2)/2 < S2-L2(S2 \cdot \phi p-1) < (S2+L2)/2$ is satisfied.

10. An optical scanning device according to claim 9, wherein the unnecessary light incident on said first light blocking member and intercepted thereby is a convergent light beam in the sub-scan section.

11. An optical scanning device according to claim 9, wherein said two scanning units are configured so that light beams scanningly deflected by the same deflecting surface of said deflecting means are image on different scan surfaces.

12. An optical scanning device according to claim 9, wherein said other scanning unit includes a second light blocking member configured to intercept unwanted light reflected at an optical surface of said second imaging optical element and directed to the scan surface at the other scanning unit side, wherein said first imaging optical element of said one scanning unit is provided at a light path between said second imaging optical element and said second light blocking member, and wherein said first imaging optical element has a positive refracting power in the sub-scan section in which the unwanted light reflected at the optical surface of said second imaging optical element and directed to the scan surface at the other scanning unit side passes.

13. An image forming apparatus, comprising:
an optical scanning device as recited in claim 9;
a photosensitive member disposed at said scan surface;
a developing device configured to develop an electrostatic latent image formed on said photosensitive member by a light beam scanned by said optical scanning device, into a toner images;
a transfer unit configured to transfer a developed toner image to a transfer material; and
a fixing device configured to fix the transferred toner images on the transfer material.

14. An image forming apparatus, comprising:
an optical scanning device as recited in claim 9; and
a printer controller for converting code data supplied from an outside machine into an imagewise signal and for inputting the imagewise signal into said optical scanning device.

15. A color image forming apparatus, comprising:
an optical scanning device as recited in claim 9; and
a plurality of image bearing members each being disposed at a surface to be scanned by said optical scanning device, for forming images of different colors.

16. A color image forming apparatus according to claim 15, further comprising a printer controller for converting a color signal supplied from an outside machine into imagewise data of different colors and for inputting the imagewise data into corresponding optical scanning devices.

* * * * *